United States Patent
Hwang et al.

(10) Patent No.: US 12,075,548 B2
(45) Date of Patent: Aug. 27, 2024

(54) INDUCTION HEATING TYPE COOKTOP FOR HEATING VARIOUS OBJECTS

(71) Applicant: LG Electronics Inc., Seoul (KR)

(72) Inventors: Seonghoon Hwang, Seoul (KR); Wontae Kim, Seoul (KR); Seongjun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 353 days.

(21) Appl. No.: 16/901,708

(22) Filed: Jun. 15, 2020

(65) Prior Publication Data

US 2021/0259063 A1    Aug. 19, 2021

(30) Foreign Application Priority Data

Feb. 13, 2020    (KR) .................. 10-2020-0017638

(51) Int. Cl.
*H05B 6/12* (2006.01)
*H05B 3/74* (2006.01)
*H05B 6/06* (2006.01)
*H05B 6/10* (2006.01)

(52) U.S. Cl.
CPC ............. *H05B 6/1209* (2013.01); *H05B 3/74* (2013.01); *H05B 6/062* (2013.01); *H05B 6/105* (2013.01)

(58) Field of Classification Search
CPC combination set(s) only.
See application file for complete search history.

(56) References Cited

U.S. PATENT DOCUMENTS

| | | | |
|---|---|---|---|
| 6,633,023 B2 | 10/2003 | Cornec et al. | |
| 6,770,857 B2 | 8/2004 | Hirota et al. | |
| 7,081,603 B2 | 7/2006 | Hoh et al. | |
| 2005/0115957 A1* | 6/2005 | Kataoka | H05B 6/062 219/620 |
| 2008/0073337 A1 | 3/2008 | Haag | |

FOREIGN PATENT DOCUMENTS

| | | |
|---|---|---|
| EP | 1404154 | 3/2004 |
| EP | 1437920 | 7/2004 |
| EP | 1487239 | 12/2004 |
| EP | 1536669 | 6/2005 |

(Continued)

OTHER PUBLICATIONS

EP Extended European Search Report in European Appln. No. 20192610.2, dated Feb. 3, 2021, 7 pages.

(Continued)

*Primary Examiner* — Dana Ross
*Assistant Examiner* — Kuangyue Chen
(74) *Attorney, Agent, or Firm* — Fish & Richardson P.C.

(57) ABSTRACT

An induction heating type cooktop includes a cover plate, a working coil, a thin film, an additional metal film, and an insulator. The cover plate is coupled to a top of a case and includes an upper plate configured to place an object to be heated. The working coil is disposed in the case and configured to heat the object. The thin film is disposed on the upper plate. The additional metal film forms an equivalent circuit with the thin film and the object so as to allow an induced current by the working coil to be induced into the object arranged at the upper plate. The insulator is disposed between a bottom surface of the upper plate and the working coil.

20 Claims, 26 Drawing Sheets

(56) References Cited

FOREIGN PATENT DOCUMENTS

| | | | |
|---|---|---|---|
| EP | 3270660 | 1/2018 | |
| EP | 3706511 | 9/2020 | |
| EP | 3840529 | 6/2021 | |
| EP | 3840531 | 6/2021 | |
| EP | 3869911 | 12/2022 | |
| ES | 2399733 | 4/2013 | |
| ES | 2399733 A1 * | 4/2013 | ........... H05B 6/1209 |
| JP | 3496558 | 2/2004 | |
| JP | 2008293888 | 12/2008 | |
| JP | 2008311058 | 12/2008 | |
| JP | 5630495 | 11/2014 | |

OTHER PUBLICATIONS

Extended European Search Report in European Appln. No. 24156518.3, mailed on Jun. 3, 2024, 12 pages.

* cited by examiner

INDUCTION HEATING TYPE COOKTOP FOR HEATING VARIOUS OBJECTS

CROSS-REFERENCE TO RELATED APPLICATION

This application claims the benefit of Korean Patent Application No. 10-2020-0017638, filed on Feb. 13, 2020, the disclosure of which is incorporated herein in its entirety by reference.

TECHNICAL FIELD

The present disclosure relates to an induction heating type cooktop capable of heating objects made of various materials.

BACKGROUND

Various types of cookware are used to cook food at home or at restaurants. For example, gas ranges may use gas as fuel to heat food. In some cases, cooking devices may heat a target heating object such as a pot and a cooking vessel using electricity rather than gas.

Methods for electrically heating a target heating object may include a resistance heating method and an induction heating method. In the electric resistance heating method, a target heating object may be heated based on a current that flows in a metal resistance wire or a non-metallic heating element such as Silicon Carbide (SIC) to generate heat which is then transferred to the target heating object (e.g., a cooking vessel) through heat dissipation or heat transfer. In the induction heating method, a target heating object may be heated by an eddy current generated in the target heating object made of a metal material, using an electrical field that is generated around a coil when a high frequency power having a predetermined magnitude is applied to the coil.

The induction heating method may be applied to cooktops. In some cases, a cooktop using an induction heating method may only heat an object made of a magnetic material. That is, when an object made of a nonmagnetic material (for example, heat-resistant glass, porcelain, etc.) is disposed on the cooktop, the cooktop may not heat the nonmagnetic material object.

Some induction heating devices may include a heating plate disposed between a cooktop and a nonmagnetic object to heat the object. Referring to Japanese Patent Application Laid-Open Publication No. 5630495 (Oct. 17, 2014), a method of implementing induction heating by adding a heating plate is disclosed. However, the aforementioned method has low heating efficiency of the heating plate, and a longer cooking time to heat ingredients contained in the target heating object.

Some hybrid cooktops may heat a nonmagnetic object through a radiant heater using an electric resistance heating method, where a magnetic object is heated through a working coil by induction. In some cases, an induction heating method is applied to such hybrid cooktops. Referring to Japanese Patent Application Laid-Open Publication No. 2008-311058 (Dec. 25, 2008), a configuration of the hybrid cooktop is disclosed. However, the aforementioned method has the hybrid cooktops having a low output of the radiant heater and a low heating efficiency. A user may feel inconvenience in considering a material of a target heating object when placing the target heating object in the heating area.

Some all-metal cooktops may heat a metal object (e.g., a nonmagnetic metal and a magnetic object). Referring to U.S. Pat. No. 6,770,857 (Aug. 3, 2004), a configuration of the all metal cooktop is disclosed.

However, the aforementioned method may not heat a nonmagnetic and non-metallic object. In addition, a heating efficiency may be lower than a radiant heater technology, and a material cost may be high.

SUMMARY

In an aspect of the present disclosure, there is provided an induction heating type cooktop capable of heating both a magnetic material and a nonmagnetic material.

In another aspect of the present disclosure, there is provided an induction heating type cooktop capable of directly or indirectly heating an object made of a variety of materials, including the object made of aluminum, using the same heat source.

The present disclosure should not be limited to the aforementioned aspects and advantages, and other unmentioned aspects and advantages will be clearly understood by those skilled in the art from the following description and more clearly understood in implementations of the present disclosure. Furthermore, the aspects and advantages of the present disclosure can be realized by means disclosed in the accompanying claims or combination thereof.

Particular implementations of the present disclosure described herein provide an induction cooktop that includes an upper plate, a working coil, a thin film, a metal film, and an insulator. The upper plate may be configured to support an object to be heated. The working coil may be configured to heat the object. The thin film may be disposed on the upper plate. The metal film may form an equivalent circuit with the thin film and the object and be configured to allow a current of the working coil to be induced into the object supported on the upper plate. The insulator may be disposed between the upper plate and the working coil.

In some implementations, the induction cooktop may optionally include one or more of the following features. The equivalent circuit may have a resistance component and an inductor component which represent the metal film, the thin film, and the object. The equivalent circuit may have a resistance component and an inductor component which represent the metal film, the thin film, and the object that is made of aluminum. The thin film may be disposed on a first surface or a second surface of the upper plate that is opposite to the first surface. The induced current may be applied to the thin film and the magnetic object to heat the object that is is a magnetic object that is not made of aluminum. A first magnitude of the induced current being applied to the magnetic object may be greater than a second magnitude of the induced current being applied to the thin film. The metal film may be made of a material capable of being heated based on the induced current. The metal film may include a cutout portion that prevents the induced current from flowing. The cutout portion of the metal film may extend at least from a center of the metal film towards an outer boundary of the metal film. The metal film may have a shape of at least one of the thin film and the working coil. The metal film may include a plurality of metal film parts. At least one of the plurality of metal film parts may have a shape of at least one of the thin film and the working coil. The metal film may be positioned between the working coil and the upper plate so that the object placed on the upper plate is heated based on at least one of the induced current or a transferred heat from the thin film heated by the working coil. The metal film may be arranged between the upper plate and the insulator or between the thin film and the insulator. The metal film may have an area equal to or smaller than a predetermined area. A thickness of the thin film may be smaller than a skin depth of the thin film. A sum of a thickness of the thin film and a thickness of the metal film may be less than a sum of a skin depth of the thin film and a skin depth of the metal film. The induction cooktop may include a case configured to house the working coil. The upper plate may be coupled to the case. The induction cooktop may include a cover plate that includes the upper plate and is coupled to the case. At least two of the plurality of metal film parts may be separated from each other. The at least two of the plurality of metal film parts may be disposed coaxially with respect to each other.

According to some implementations of the present disclosure, there is provided an induction heating type cooktop including a cover plate coupled to a top of a case, the cover plate comprising an upper plate configured to place an object to be heated, a working coil disposed in the case and configured to heat the object, a thin film disposed on the upper plate, an additional metal film forming an equivalent circuit with the thin film and the object so as to allow an induced current by the working coil to be induced into the object arranged at the upper plate, and an insulator disposed between a bottom surface of the upper plate and the working coil.

The induction heating type cooktop according to the present disclosure may perform heating through a thin film capable of being directly inductively heated, and may further use an additional metal film capable of forming an equivalent circuit with an object. Accordingly, a metallic container which has been conventionally incapable of induction heating may be allowed to be inductively heated and thereby form an equivalent circuit with an additional metal film. A resistance component and an inductor component of the equivalent circuit formed by the additional metal film and the object together may be included in a resistance component and an inductor component that a microcontroller unit (MCU) can recognize as being capable of induction heating.

BRIEF DESCRIPTION OF THE DRAWINGS

The above and other aspects, features, and advantages of certain implementations will be more apparent from the following detailed description taken in conjunction with the accompanying drawings, in which.

DETAILED DESCRIPTION

Figure 1:
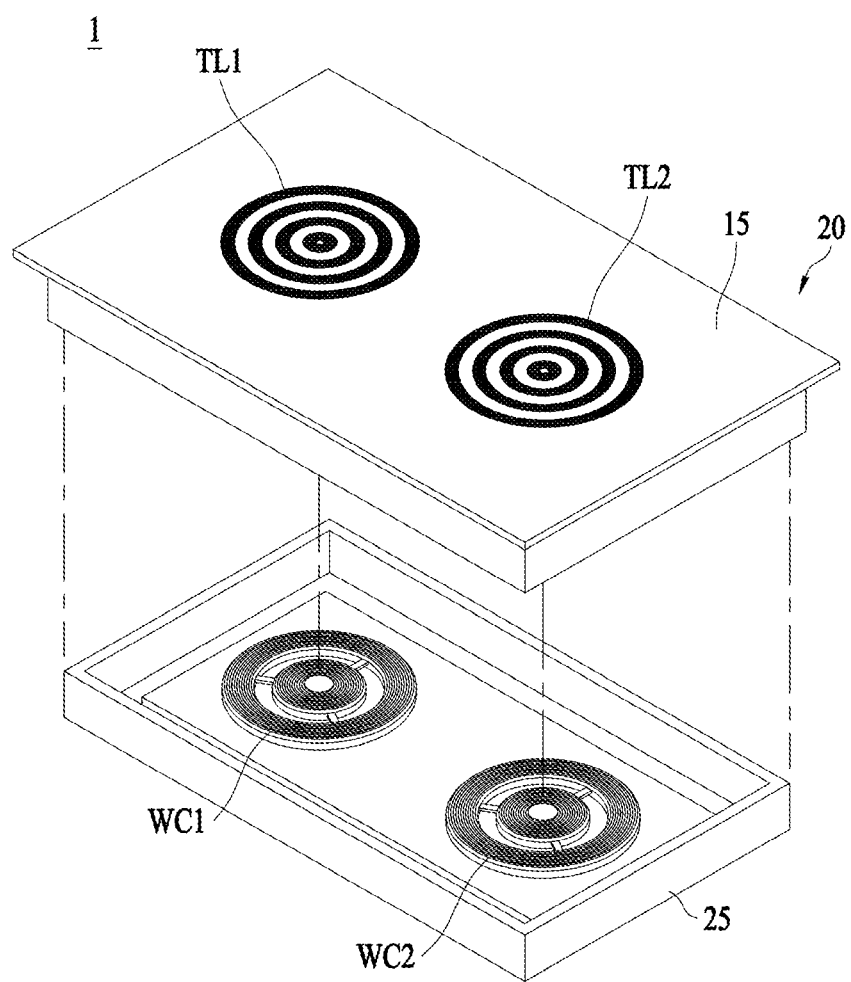
FIG. 1 is a diagram illustrating an example of an induction heating type cooktop according to the present application.

Hereinafter, implementations of the present disclosure will be described in detail with reference to the drawings so that those skilled in the art to which the present disclosure pertains can easily perform the present disclosure. The present disclosure may be implemented in many different forms and is not limited to the implementations described herein.

In illustrating this application, parts and configurations that are known or not relevant to the gist of the present disclosure may be omitted. The same or similar components are denoted by the same reference numerals throughout the specification and the drawings to the extent possible.

Further, for convenience of explanation of the present disclosure, some components may be described as multiple subcomponents although such components may be implemented in a single component, device or module. Further, a single component described herein may be implemented into a plurality of components, devices or modules.

Hereinafter, an example induction heating type cooktop according to some implementations of the present disclosure will be described.

FIG. 1 is a diagram illustrating an example induction heating type cooktop.

Referring to FIG. 1, an induction heating type cooktop 1 may include a case 25, a cover plate 20, working coils WC1 and WC2 (that is, first and second working coils), and thin films TL1 and TL2 (that is, first and second thin films). The working coils WC1 and WC2 may be installed in the case 25.

In some implementations, various devices may be disposed in the case 25 and configured to actuate the working coils WC1 and WC2. For example, the devices for actuating the working coils may include a power part for providing alternating current power, a rectifying part for rectifying alternating current power from the power part to direct current power, an inverter part for inverting the direct power rectified by the rectifying part to a resonance current through a switching operation, a control part for controlling operations of various devices in the induction heating type cooktop 10, a relay or a semi-conductor switch for turning on and off a working coil, and other suitable parts.

The cover plate 20 may be coupled to a top of the case 25, and may include an upper plate 15 for placing a target object to be heated on the top. For example, the cover plate 20 may include the upper plate 15 for placing a target object to be heated, such as a cooking vessel. In some examples, the upper plate 15 may be made of a glass material (e.g., ceramic glass).

In some implementations, an input interface may be provided in the upper plate 15 to receive an input from a user and transmit the input to a control part for the input interface. The input interface may be provided at a position other than the upper plate 15.

The input interface may be configured to allow a user to input a desired heat intensity or an operation time of the induction heating type cooktop 10. The input interface may be implemented in various forms, such as a mechanical button or a touch panel. The input interface may include, for example, a power button, a lock button, a power control button (e.g., "+", "-", etc.), a timer control button (e.g., "+", "-", etc.), a charging mode button, and other suitable buttons. The input interface may transmit an input provided by a user to a control part for the input interface, and the control part for the input interface may transmit the input to the aforementioned control part (that is, a control part for an inverter). The aforementioned control part may control operations of various devices (e.g., a working coil) based on the input (that is, a user input) provided from the control part for the input interface. In some examples, the control part may include a controller, a processor, or an electric circuit.

The upper plate 15 may visually display whether the working coils WC1 and WC2 are being driven or not and intensity of heating (that is, thermal power). For example, a fire hole shape may be displayed in the upper plate 15 by an indicator that includes a plurality of light emitting devices (e.g., light emitting diodes (LEDs)) disposed in the case 25.

The working coils WC1 and WC2 may be installed inside the case 25 to heat a target heating object. For example, driving of the working coils WC1 and WC2 may be controlled by the aforementioned control part. When the target heating object is positioned on the upper plate 15, the working coils WC1 and WC2 may be driven by the control part.

In some implementations, the working coils WC1 and WC2 may directly heat a magnetic target heating object (that is, a magnetic object) and may indirectly heat a nonmagnetic target heating object (that is, a nonmagnetic object) through the thin films TL1 and TL2, as described herein.

The working coils WC1 and WC2 may heat a target heating object by employing an induction heating method. The working coils WC1 and WC2 may be disposed to overlap the thin films TL1 and TL2 in a longitudinal direction (that is, a vertical direction or an up-down direction).

Although FIG. 1 illustrates that two working coils WC1 and WC2 are installed in the case 25, the present disclosure are not limited to the illustrated implementation. That is, one working coil or three or more working coils may be installed in the case 25.

The thin films TL1 and TL2 may be disposed (e.g., coated) on the upper plate 15 to heat a nonmagnetic object among target heating objects. For example, the thin films TL1 and TL2 may be disposed on a top surface or a bottom surface of the upper plate 15 and may be provided to overlap the working coils WC1 and WC2 in the longitudinal direction (that is, the vertical direction or the up-down direction). Accordingly, it may be possible to heat the corresponding target heating object, regardless of a position and a type of the target heating object.

The thin films TL1 and TL2 may have at least one of a magnetic property or a nonmagnetic property (that is, either or both of the magnetic property and the nonmagnetic property).

In some implementations, the thin films TL1 and TL2 may be, for example, composed of a conductive material (e.g., aluminum). As shown in the drawings (e.g., FIG. 1), the thin films TL1 and TL2 may be disposed on a top surface of the upper plate 15 in a pattern such that a plurality of rings having different diameters is repeated (e.g., coaxially disposed). However, other configurations of the thin films are possible in other implementations. For example, the thin films TL1 and TL2 may include a material other than a conductive material and may be disposed on the upper plate 15 by taking a different form. Hereinafter, for convenience of explanation, the thin films TL1 and TL2 are described as being made of a conductive material and disposed on the upper plate 15 in the form of a plurality of rings having different diameters.

FIG. 1 shows two thin films TL1 and TL2, but the number of thin films included in the cooktop 1 is not limited thereto. For example, one thin film or three or more thin films may be coated. Further, the elements and dispositional relationship between the elements shown in FIG. 1 are for illustrative purposes, and therefore, the shapes, numbers, and positions of the elements should not be construed as being limited to the example shown in FIG. 1.

The specific features of the thin films TL1 and TL2 will be described in more detail herein.

Figure 2:
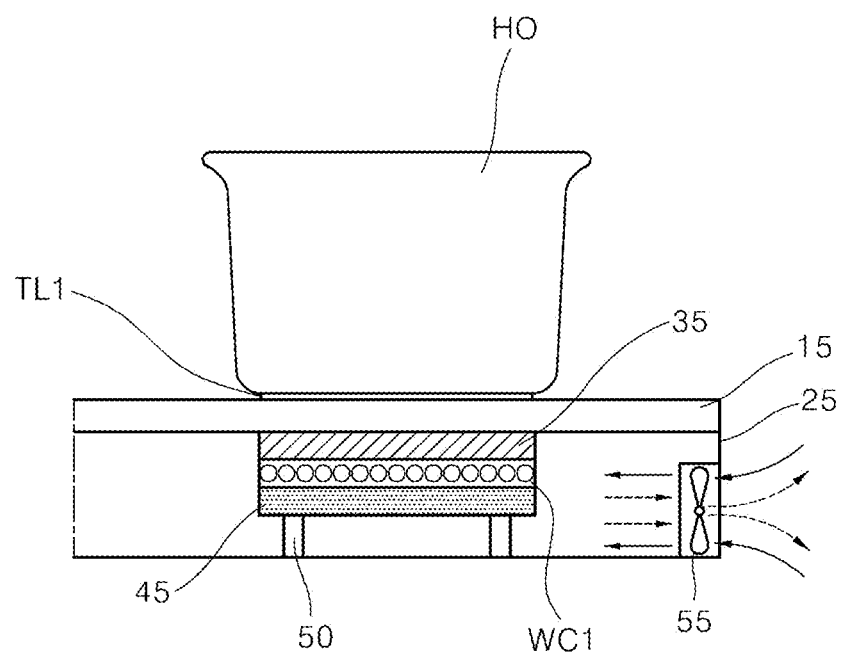
FIG. 2 is a diagram illustrating example elements disposed in an example case of the induction heating type cooktop shown in FIG. 1.

FIG. 2 is a diagram illustrating example elements provided inside the case of the induction heating type cooktop shown in FIG. 1. Referring to FIG. 2, the induction heating type cooktop 1 may further include an insulator 35, a shield plate 45, a support member 50, and a cooling fan 55.

Since elements disposed in the surroundings of a first working coil WC1 are identical to elements disposed in the surroundings of a second working coil WC2 (the working coil in FIG. 1), the elements (e.g., the first thin film TL1, the insulator 35, the shield plate 45, the support member 50, and the cooling fan 55) in the surroundings of the first working coil WC1 will be hereinafter described for convenience of explanation.

The insulator 35 may be provided between a bottom surface of the upper plate 15 and the first working coil WC1. For example, the insulator 35 may be mounted to the cover plate 20 or the bottom of the upper plate 15. The first working coil WC1 may be disposed below the insulator 35.

The insulator 35 may block heat that is generated when the first thin film TL1 or a target heating object HO is heated upon driving of the first working coil WC1. The insulator 35 may prevent the generated heat from being transferred to the first working coil WC1.

For example, when the first thin film TL1 or the target heating object HO is heated by electromagnetic induction of the first working coil WC1, the heat of the first thin film TL1 or the target heating object HO may be transferred to the upper plate 15 and the heat transferred to the upper plate 15 may be transferred to the first working coil WC1, thereby possibly causing damage to the first working coil WC1. By blocking the heat from being transferred to the first working coil WC1, the insulator 35 may prevent damage of the first working coil WC1 that may otherwise be caused by the heat and furthermore prevent degradation of heating performance of the first working coil WC1.

In some implementations, a spacer may be installed between the first working coil WC1 and the insulator 35. For example, the spacer may be inserted between the first working coil WC1 and the insulator 35, so that the first working coil WC1 and the insulator 35 do not directly contact each other. Accordingly, the spacer may block heat that is generated when the first thin film TL1 and the target heating object HO are heated upon driving of the first working coil WC1 such that the generated heat is prevented from being transferred to the first working coil WC1 through the insulator 35.

Because the spacer may perform the same or similar function as the insulator 35, the spacer may allow using the insulator 35 having a smaller thickness and accordingly reducing a gap between the target heating object HO and the first working coil WC1.

In some implementations, a plurality of spacers may be provided, and the plurality of spacers may be disposed to be spaced apart from each other in the gap between the first working coil WC1 and the insulator 35. Accordingly, air suctioned into the case 25 by the cooling fan 55 may be guided to the first working coil WC1 by the spacers. For example, the spacers may guide air, introduced into the case 25 by the cooling fan 55, to be properly transferred to the first working coil WC1, thereby improving cooling efficiency of the first working coil WC1.

The shield plate 45 may be mounted to a bottom of the first working coil WC1 to block a magnetic field occurring downwardly upon driving of the first working coil WC1. For example, the shield plate 45 may block the magnetic field occurring downwardly upon driving of the first working coil WC1 and may be supported upwardly by the support member 50.

The support member 50 may be installed between a bottom surface of the shield plate 45 and a bottom surface of the case 25 to support the shield plate 45 upwardly. For example, by supporting the shield plate 45 upwardly, the support member 50 may indirectly support the insulator 35 and the first working coil WC1 upwardly. In doing so, the insulator 35 may be brought into tight contact with the upper plate 15. As a result, it may be possible to maintain a constant gap between the first working coil WC1 and the target heating object HO.

The support member 50 may include, for example, an elastic object (e.g., a spring) to support the shield plate 45 upwardly, but aspects of the present disclosure are not limited thereto. In other implementations, the support member 50 may be removed from the induction heating type cooktop 1.

The cooling fan 55 may be installed inside the case 25 to cool the first working coil WC1. For example, driving of the cooling fan 55 may be controlled by the aforementioned control part and the cooling fan 55 may be installed at a side wall of the case 25. Alternatively, the cooling fan 55 may be installed at a position other than the side wall of the case 25.

The cooling fan 55 may suction ambient air from the outside of the case 25, as shown in FIG. 2, and transfer the suctioned air to the first working coil WC1. In addition or alternatively, the cooling fan 55 may draw interior air (e.g., heated air) of the case 25 and discharge the air to the outside of the case 25. Accordingly, it may be possible to efficiently cool internal elements (e.g., first working coil WC1) of the case 25.

In some examples, the ambient air transferred from the outside of the case 25 to the first working coil WC1 by the cooling fan may be guided to the first working coil WC1 by the spacer. Accordingly, it may be possible to directly and efficiently cool the first working coil WC1, thereby improving durability of the first working coil WC1. That is, it may be possible to improve the durability by preventing thermal damage.

In some examples, the induction heating type cooktop 1 may include one or more of the above-described features and configurations. Hereinafter, example features and configurations of the aforementioned thin film will be described in more detail with reference to FIGS. 3 to 6.

Figure 3:
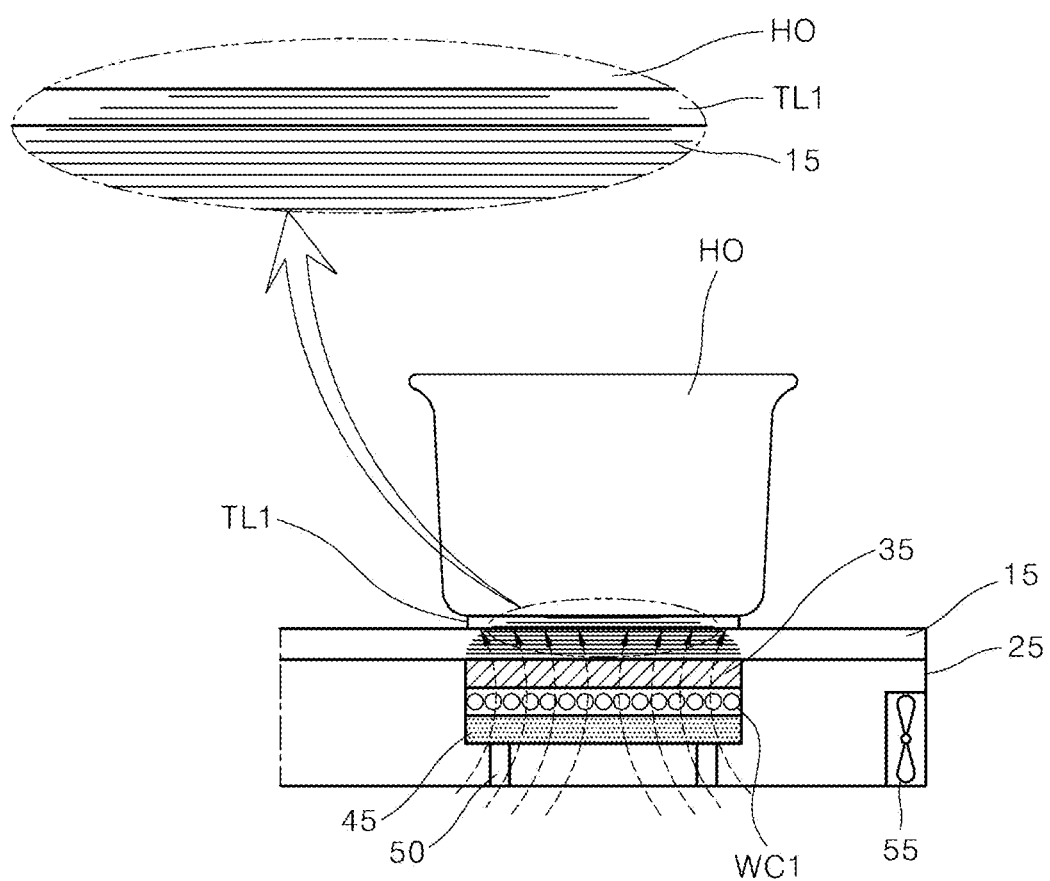
FIGS. 3 and 4 are diagrams illustrating examples of a thickness of a thin film and a skin depth of the thin film of an induction heating type cooktop.
Figure 4:
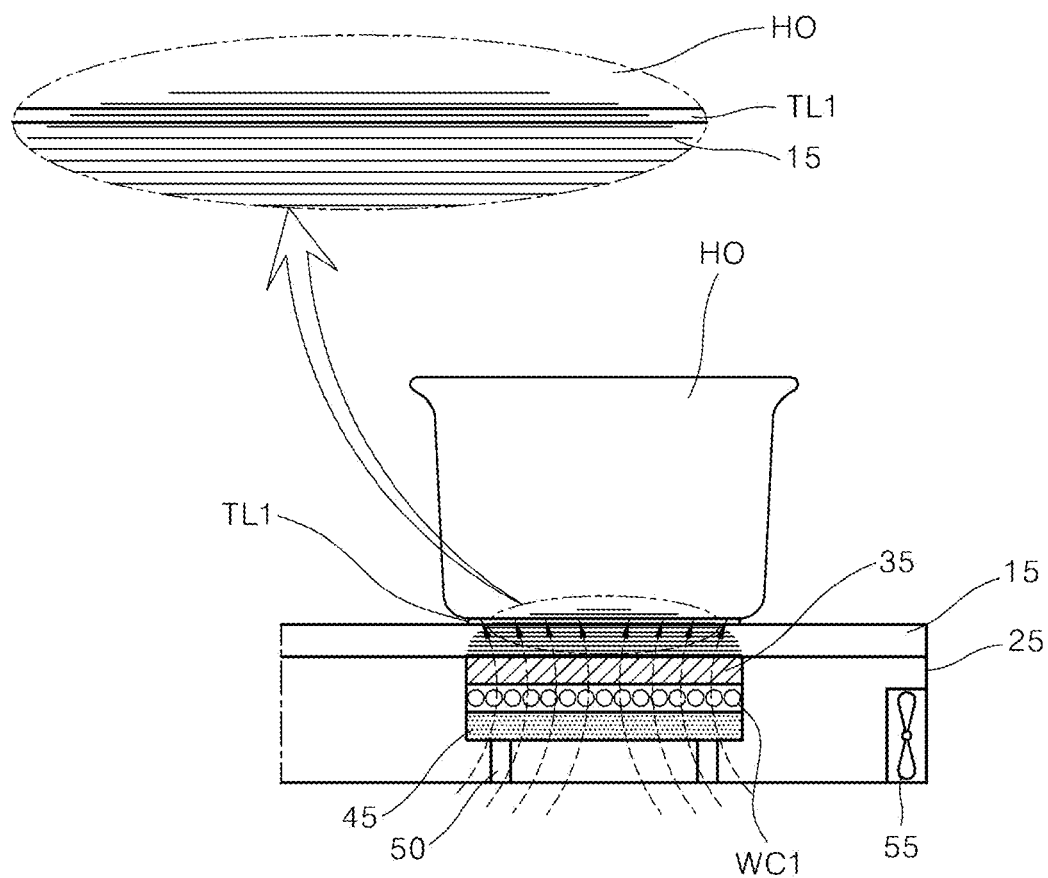
Figure 5:
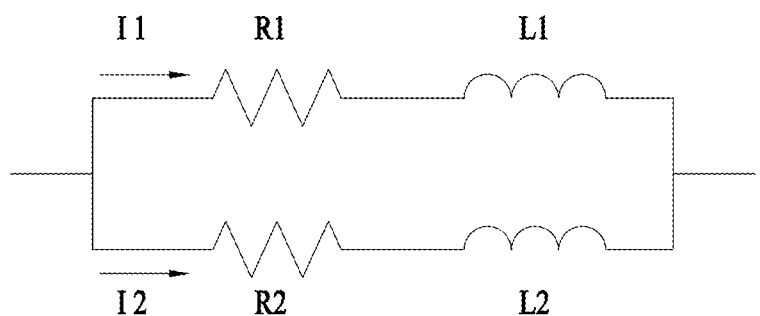
FIGS. 5 and 6 are diagrams illustrating examples of an electric impedance between a thin film and a target heating object depending on a type of the target heating object.
Figure 6:
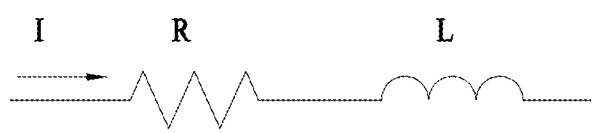

FIGS. 3 and 4 are diagrams illustrating a relation between a thickness and a skin depth of a thin film. FIGS. 5 and 6 are diagrams illustrating a variation of impedance between a thin film and a target heating object depending on a type of the target heating object.

The first thin film TL1 and the second thin film TL2 may have the same technical features, and the thin film TL1 and TL2 may be disposed on the top surface or the bottom surface of the upper plate 15. Hereinafter, for convenience of explanation, the first thin film TL1 disposed on the top surface of the upper plate 15 will be described as an example.

The first thin film TL1 has one or more of the following features. In some implementations, the first thin film TL1 may include a material having a low relative permeability. For example, since the first thin film TL1 has a low relative permeability, the skin depth of the first thin film TL1 may be deep. The skin depth may refer to a depth by which a current can penetrate a material surface, and the relative permeability may be disproportional to the skin depth. Accordingly, the lower the relative permeability of the first thin film TL1, the deeper the skin depth of the first thin film TL1.

In some examples, the skin depth of the first thin film TL1 may have a value greater than a value corresponding to a thickness of the first thin film TL1. That is, since the first thin film TL1 has a thin thickness (e.g., a thickness of 0.1 μm~1,000 μm) and a skin depth of the first thin film TL1 is greater than the thickness of the first thin film TL1, a magnetic field occurring by the first working coil WC1 may pass through the first thin film TL1 and be then transferred to the target heating object HO. As a result, an eddy current may be induced to the target heating object HO.

For example, as illustrated in FIG. 3, when the skin depth of the first thin film TL1 is narrower than the thickness of the first thin film TL1, it is difficult for the magnetic field generated by the first working coil WC1 to reach the target heating object HO.

In some implementations, as illustrated in FIG. 4, when the skin depth of the first skin depth TL1 is deeper than the thickness of the first thin film TL1, most of the magnetic field generated by the first working coil WC1 may be transferred to the target heating object HO. Because the skin depth of the first thin film TL1 is deeper than the thickness of the first thin film TL1, the magnetic field generated by the first working coil WC1 may pass through the first thin film TL1 and most of the magnetic field energy may be dissipated in the target heating object HO. Accordingly, the target heating object HO may be heated primarily.

Since the first thin film TL1 has a thin thickness as described above, the thin film TL1 may have a resistance value that allows the first thin film TL1 to be heated by the first working coil WC1. For example, the thickness of the first thin film TL1 may be disproportional to the resistance value of the first thin film TL1 (that is, a sheet resistance value). That is, the thinner the first thin film TL1 is, the greater the resistance value (that is, the sheet resistance) of the first thin film TL1 is. As thinly disposed on the upper plate 15, the first thin film TL1 may change in property to a load resistance at which heating may be possible. In some implementations, the first thin film TL1 may have a thickness of, for example, 0.1 μm to 1,000 μm, but not limited thereto.

The first thin film TL1 having the above-described characteristic can be configured to heat a nonmagnetic object. In some implementations, an impedance property between the first thin film TL1 and the target heating object HO may vary according to whether the target heating object HO positioned on the top of the upper plate 15 is a magnetic object or a nonmagnetic object.

One or more examples, where the target heating object is a magnetic object, will be described in the following.

Referring to FIGS. 2 and 5, when the first working coil WC1 is driven while a magnetic target heating object HO is positioned on the top of the upper plate 15, a resistance component R1 and an inductor component L1 of the magnetic target heating object HO may form an equivalent circuit to that of a resistance component R2 and an inductor component L2 of the first thin film TL1.

In this case, in the equivalent circuit, an impedance (that is, an impedance of R1 and L1) of the magnetic target heating object HO may be smaller than an impedance (that is, an impedance of R2 and L2) of the first thin film TL1. Accordingly, when the aforementioned equivalent circuit is formed, the magnitude of an eddy current I1 applied to the magnetic target heating object HO may be greater than the magnitude of an eddy current I2 applied to the first thin film TL1. More specifically, most of eddy currents may be applied to the target heating object HO, thereby heating the target heating object HO. For example, when the target heating object HO is a magnetic object, the aforementioned equivalent circuit may be formed and most of eddy currents may be applied to the target heating object HO. Accordingly, the first working coil WC1 may directly heat the target heating object HO.

Since some of eddy currents is applied even to the first thin film TL1, the first thin film TL1 may be heated slightly. Accordingly, the target heating object HO may be secondarily heated to a certain degree by the thin film TL1. However, a degree to which the target heating object HO is heated secondarily by the first thin film TL1 may not be considered significant, as compared with a degree to which the target heating object HO is heated primarily by the first working coil WC1.

One or more examples, where a target heating object is a nonmagnetic object, will be described in the following.

Referring to FIGS. 2 and 6, when the working coil WC1 is driven while a nonmagnetic target heating object HO is positioned on the top of the upper plate 15, an impedance may not exist in the nonmagnetic target heating object HO but exists in the first thin film TL1. That is, a resistance component R and an inductor component L may exist only in the first thin film TL1. Accordingly, an eddy current I may be applied only to the first thin film TL1 and may not be applied to the nonmagnetic target heating object HO. More specifically, the eddy current I may be applied only to the first thin film TL1, thereby heating the first thin film TL1. For example, when the target heating object HO is a nonmagnetic object, the eddy current I may be applied to the first thin film TL1, thereby heating the first thin film TL1. Accordingly, the nonmagnetic target heating object HO may be heated by the first thin film TL1 that is heated by the first working coil WC1.

As described above, regardless of whether the target heating object HO is a magnetic object or a nonmagnetic object, the target heating object HO may be heated directly or indirectly by a single heating source which is the first working coil WC1. That is, when the target heating object HO is a magnetic object, the first working coil WC1 may primarily heat the target heating object HO, and, when the target heating object HO is a nonmagnetic object, the first thin film TL1 heated by the first working coil WC1 may heat the target heating object HO.

As described above, the induction heating type cooktop 1 may be capable of heating both a magnetic object and a nonmagnetic object. Thus, the induction heating type cooktop 1 may be capable of heating a target heating object regardless of a position and a type of the target heating object. Accordingly, without determining whether the target heating object is a magnetic object or a nonmagnetic object, a user is allowed to place the target heating object in any heating region on the top plate, and therefore, convenience of use may improve.

In addition, the induction heating type cooktop 1 may directly or indirectly heat a target heating object using the same heating source, and therefore, a heat plate or a radiant heater is not necessary. Accordingly, it may be possible to increase heating efficiency and cut down a material cost.

Hereinafter, another example induction heating type cooktop will be described.

Figure 7:
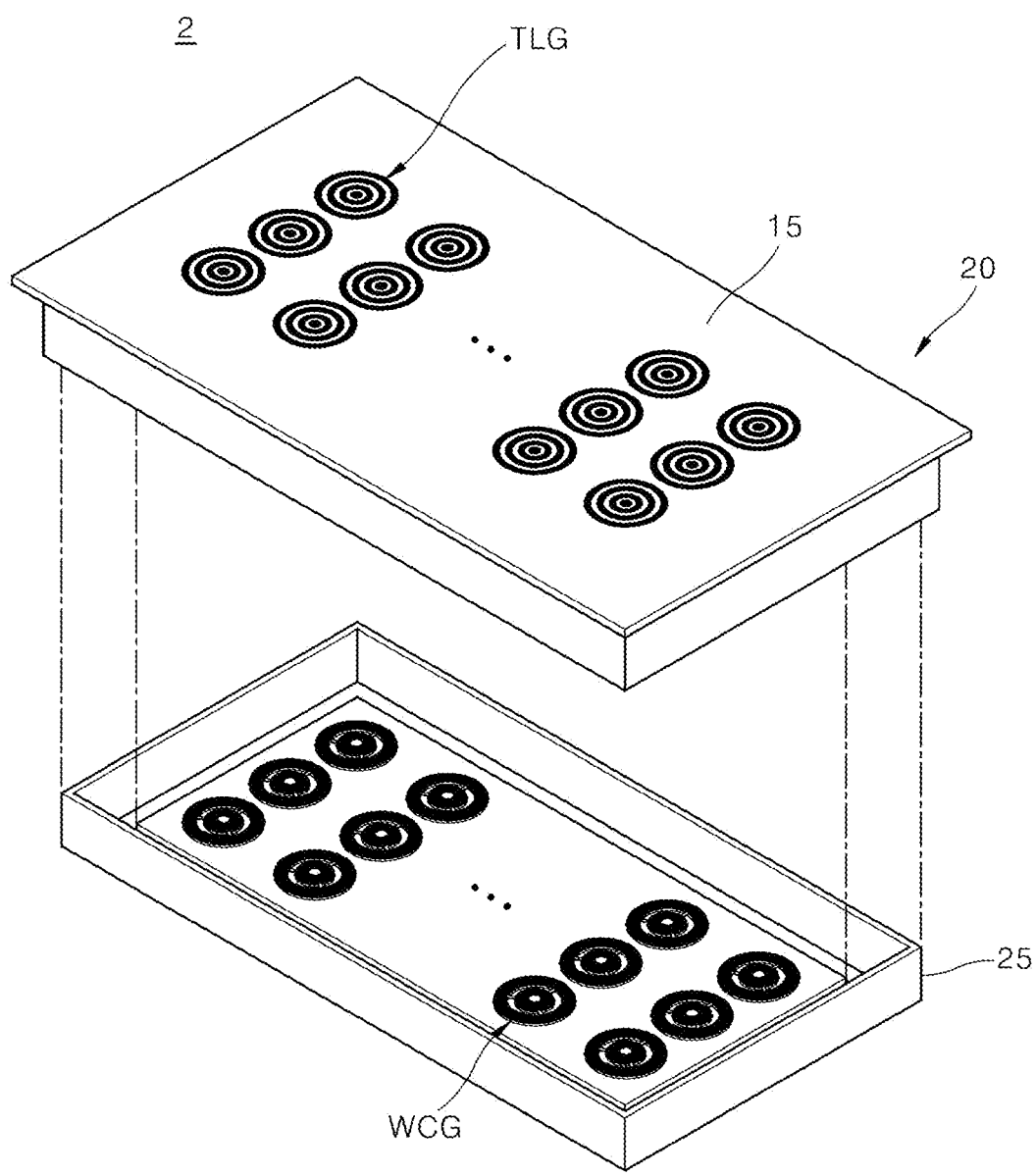
FIG. 7 is a diagram illustrating an example of an induction heating type cooktop.
Figure 8:
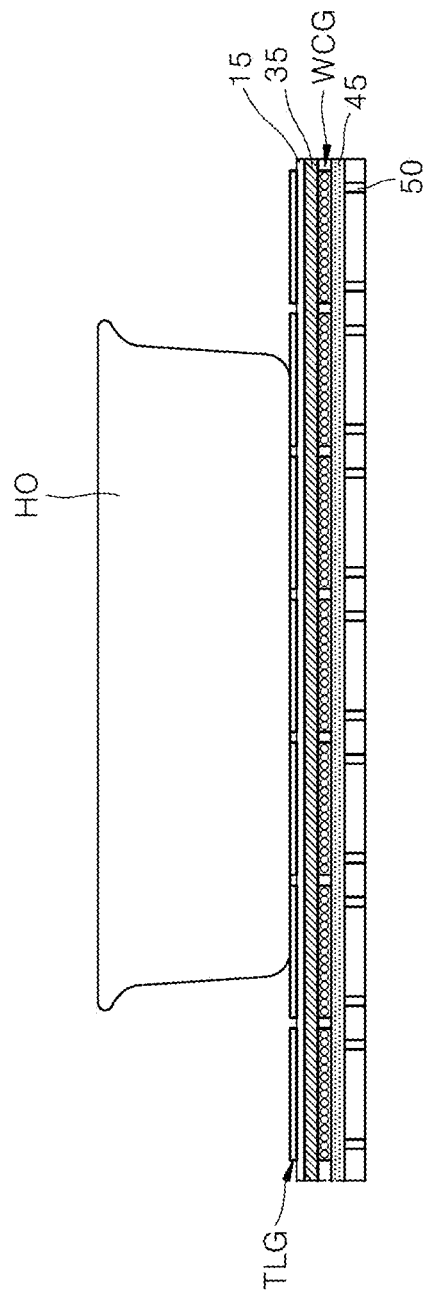
FIG. 8 is a diagram illustrating example elements disposed in an example case of the induction heating type cooktop shown in FIG. 7.
Figure 9:
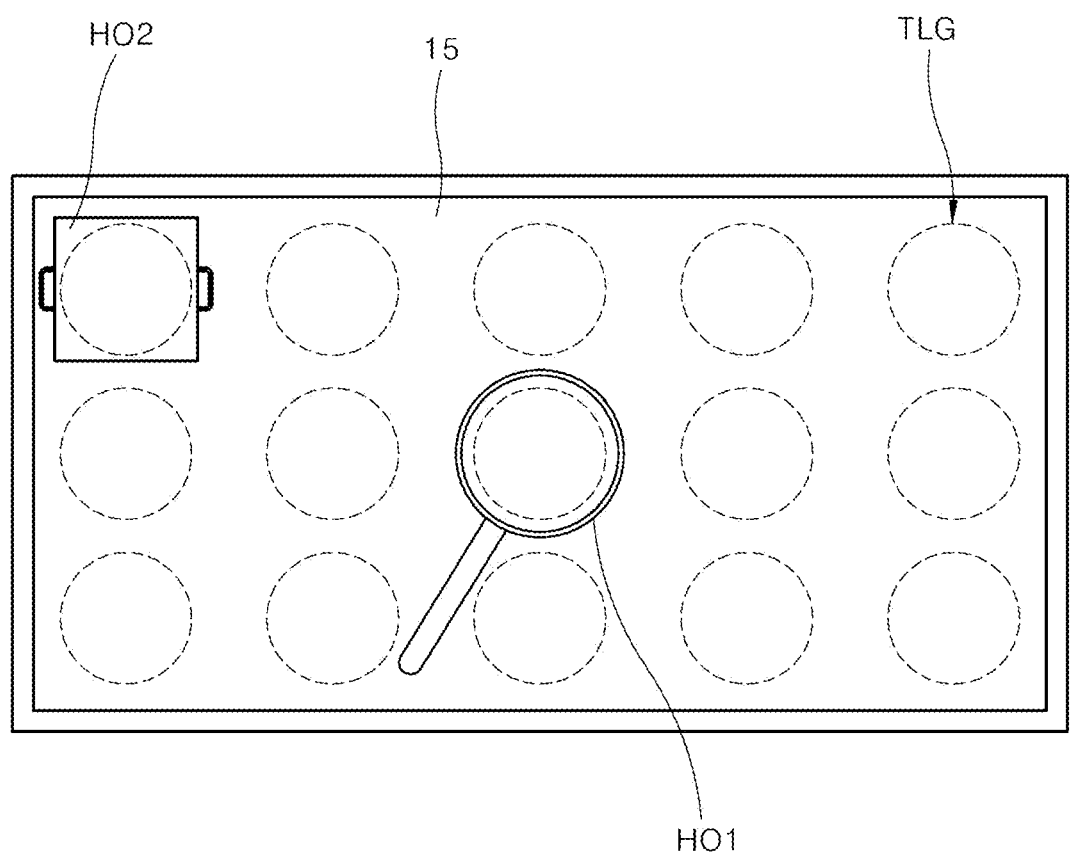
FIG. 9 is a diagram illustrating an example of a target heating object positioned on the induction heating type cooktop shown in FIG. 7.

FIG. 7 is a diagram illustrating an example induction heating type cooktop. FIG. 8 is a diagram illustrating example elements provided inside a case of the induction heating type cooktop shown in FIG. 7. FIG. 9 is a diagram illustrating an example target heating object positioned at the induction heating type cooktop shown in FIG. 7.

An induction heating type cooktop 2 is identical to the induction heating type cooktop 1 shown in FIG. 1, except for some elements and effects. Hence, differences from the induction heating type cooktop 1 will be focused and described.

Referring to FIGS. 7 and 8, unlike the cooktop 1 in FIG. 1, the induction heating type cooktop 2 may be a zone-free cooktop. In some implementations, the induction heating type cooktop 2 may include a case 25, a cover plate 20, a plurality of thin films TLGs, an insulator 35, a plurality of working coils WCGs, a shield plate 45, a support member 50, a cooling fan, a spacer, and a control part.

Here, the plurality of thin films TLGs and the plurality of WCGs may overlap in a traverse direction and may be disposed to correspond to each other in a one-to-one relationship. The plurality of thin films TLGs and the plurality of thin films WCGs may be in a many-to-many relationship rather than the one-to-one relationship. In some implementations, for example, the plurality of thin films TLGs and the plurality of working coils WCGs may be arranged in a one-to-one relationship.

For instance, the induction heating type cooktop 2 may be a zone-free cooktop including the plurality of thin films TLGs and the plurality of working coils WCGs, and therefore, it may be possible to heat a single target heating object HO by using some or all of the plurality of working coils WCGs at the same time or by using some or all of the plurality of thin films TLGs at the same time. In some examples, it may be possible to heat the target heating object HO by using some or all of the plurality of working coils WCG and also by using some or all of the plurality of thin films TLGs.

Accordingly, as shown in FIG. 9, in this example where the plurality of working coils WCG (see FIG. 8) and the plurality of thin films TLG are present (e.g., a region of the upper plate 15), it may be possible to heat target heating objects H01 and H02, regardless of sizes, positions, and types of the target heating objects H01 and H02.

Hereinafter, an induction heating type cooktop which may be included to heat an object made of aluminum will be described. The object HO discussed below is made of aluminum.

FIGS. 10A to 10D are a diagram illustrating example elements provided in a case of an induction heating type cooktop 1000 having an additional metal film.

In some implementations, the induction heating type cooktop 1000 described in FIG. 10A and other following figures may be configured similarly to the induction heating type cooktop 1 used in various implementations described with reference to FIGS. 1 to 9. Hence, the induction heating type cooktop 1000 may selectively include one or more of the elements of the cooktop 1 described with reference to FIGS. 1-9, and thus such elements may be omitted in in FIG. 10A and other following figures.

Figure 10A:
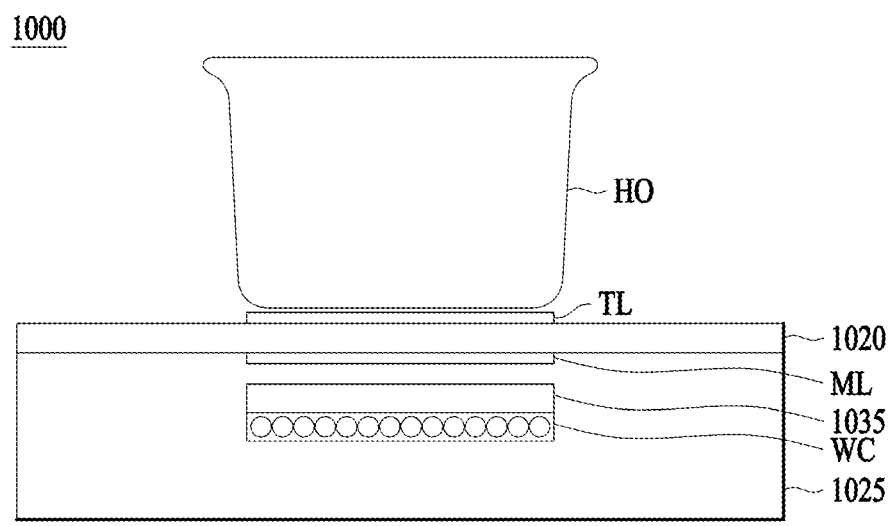
FIGS. 10A to 10D are diagrams illustrating example components provided in a case of an induction heating type cooktop having an additional metal film.
Figure 10A:
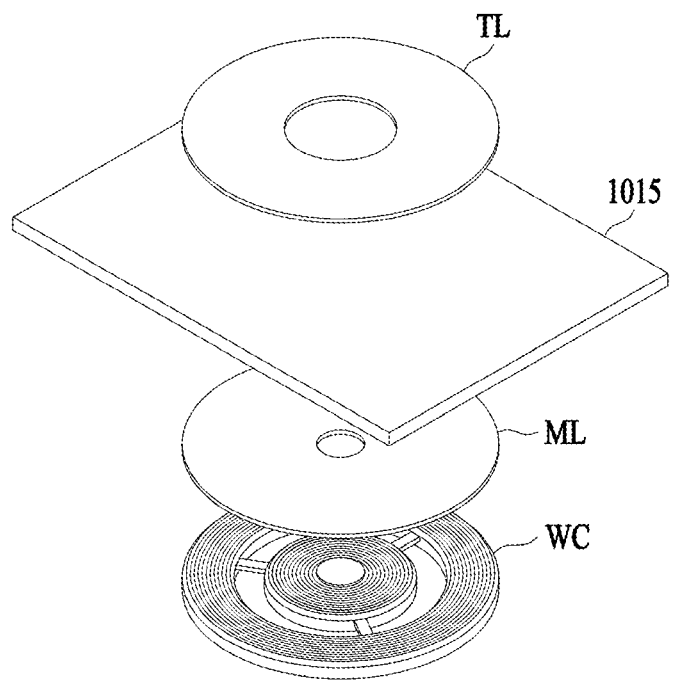

Referring to FIG. 10A, an induction heating type cooktop 1000 may include a cover plate coupled to a top of a case and having an upper plate, on a top of which a target heating object is placed, a working coil disposed in the case to heat the object, a thin film disposed on the upper plate, an additional metal film forming an equivalent circuit with the target heating object placed at the upper plate so as to allow an induced current by the working coil to be induced into the target heating object, and an insulator provided between a bottom of the upper plate and the working coil. In some implementations, the additional metal film included in the induction heating type cooktop 1000 may be configured to heat a target heating object made of aluminum.

The same or similar configurations and methods described in FIGS. 1-9 can be used by the induction heating type cooktop 1000 to heat a target heating object using an induced current when the target heating object is made of a magnetic material or a non-magnetic material. For example, in implementations where the induction heating type cooktop 1000 is provided without an additional metal film, when a target heating object made of a non-metallic material (e.g., heat-resistant glass, a pottery, etc.) other than aluminum is placed at the induction heating type cooktop 1000, the induction heating type cooktop 1000 may heat the non-magnetic material by a heating method using a current induced into a thin film. However, when a target heating object is made of aluminum, the induction heating type cooktop 1000 is not capable of heating the object by the above-described methods (described in FIGS. 1-9) because no current is induced into the thin film. Therefore, in order to heat a target heating object made of aluminum, it has been required to use a radiant heater or an all-metal cooktop. The radiant heater takes a long time to heat a target heating object due to low heating efficiency, and the all-metal cooktop has inferior heating efficiency compared to the radiant heater when it comes to heating a non-magnetic material and also requires high material costs. In order to solve the above problem, the induction heating type cooktop 1000 according to some implementations may use an additional metal film.

In some implementations, an additional metal film may be included in the induction heating type cooktop 1000. In this case, if the working coil is driven when a target heating object made of aluminum is placed on the top of the induction heating type cooktop 1000, an equivalent circuit composed of a resistance component and an inductor component may be formed, and accordingly the target heating object may be inductively heated by the working coil.

Referring to FIGS. 10A to 10D, an additional metal film ML may be included in the induction heating type cooktop 1000. In some implementations, the additional metal film ML included in the induction heating type cooktop 1000 can be arranged in relation to other configurations in various ways to the extent that the additional metal film ML is arranged between the working coil WC and the target heating object HO.

In some implementations, the additional metal film ML may be arranged at a bottom of at least one of an upper plate 1015 and the thin film TL of the induction heating type cooktop 1000, and at the top of the insulator 1035. In some implementations, in describing the spatial relationship to the additional metal film ML, the upper plate 1015, the thin film TL, and the insulator 1035, it may be understood that the expression "arranged at the top" refers to an orientation in which a target heating object HO is arranged relative to the case 1025 and that the expression "arranged at the bottom" refers to an orientation opposite to the orientation in which a target object HO is arranged relative to the case 1025. Accordingly, the description that the additional metal film ML is arranged at the top or bottom of another element is about an orientation relative to another element. Thus, it is not necessarily implied that the additional metal film ML is in contact with the upper plate 1015, the thin film TL, or the insulator 1035. That is, the additional metal film ML, the upper plate 1015, the thin film TL, and the heat insulator 1035 may be spaced apart from each other at predetermined intervals, or additional configurations (e.g., a support member, a spacer, etc.) may be arranged therebetween.

Referring to FIG. 10A, the thin film TL may be disposed on the top of the upper plate 1015, and the additional metal film ML may be arranged at the bottom of the upper plate 1015. In some implementations, the additional metal film ML may be arranged at the bottom of the upper plate 1015 and on the top of the insulator 1035. In some implementations, the induction heating type cooktop 1000 including the additional metal film ML may include the case 1025, which includes the additional metal film ML, the insulator 1035, and the working coil WC. The thin film TL may be arranged at the upper plate 1015 included in the cover plate 1020, and thus can contact with the target heating object HO.

In some implementations, when the target heating object HO is made of aluminum, the thin film TL is not inductively heated to heat the object, and when the target heating object HO is made of a magnetic material other than aluminum or made of a non-magnetic material, the thin film TL may be inductively heated. That is, the thin film TL may be made of a material capable of being inductively heated by the working coil WC.

Figure 10B:
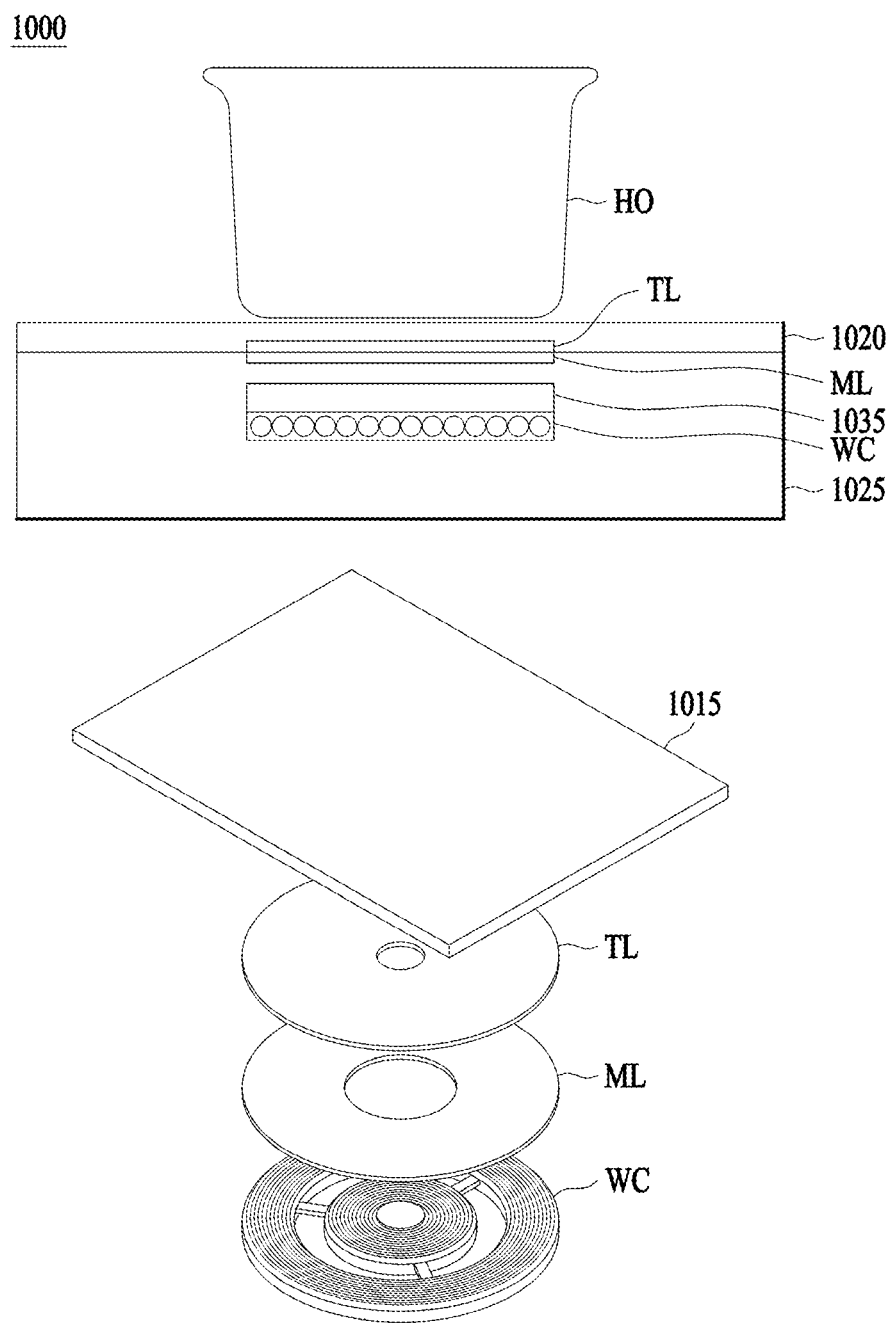

Referring to FIG. 10B, the thin film TL may be arranged at the bottom of the cover plate 1020, instead of on the top of the upper plate 1015. In some implementations, the thin film TL may be in contact with the bottom of the cover plate 1020 or may form a part of a bottom surface of the cover plate 1020 to reduce a difference in dimension caused by the presence of the thin film TL. In some implementations, the thin film TL may not be arranged at a top surface of the upper plate 1015, thereby not exposed to an outside. The thin film TL may be arranged at a bottom surface of the cover plate 1020 in various ways. In some implementations, the additional metal film ML may be arranged at the bottom of the thin film TL and on the top of the insulator 1035 at the same time.

Figure 10C:
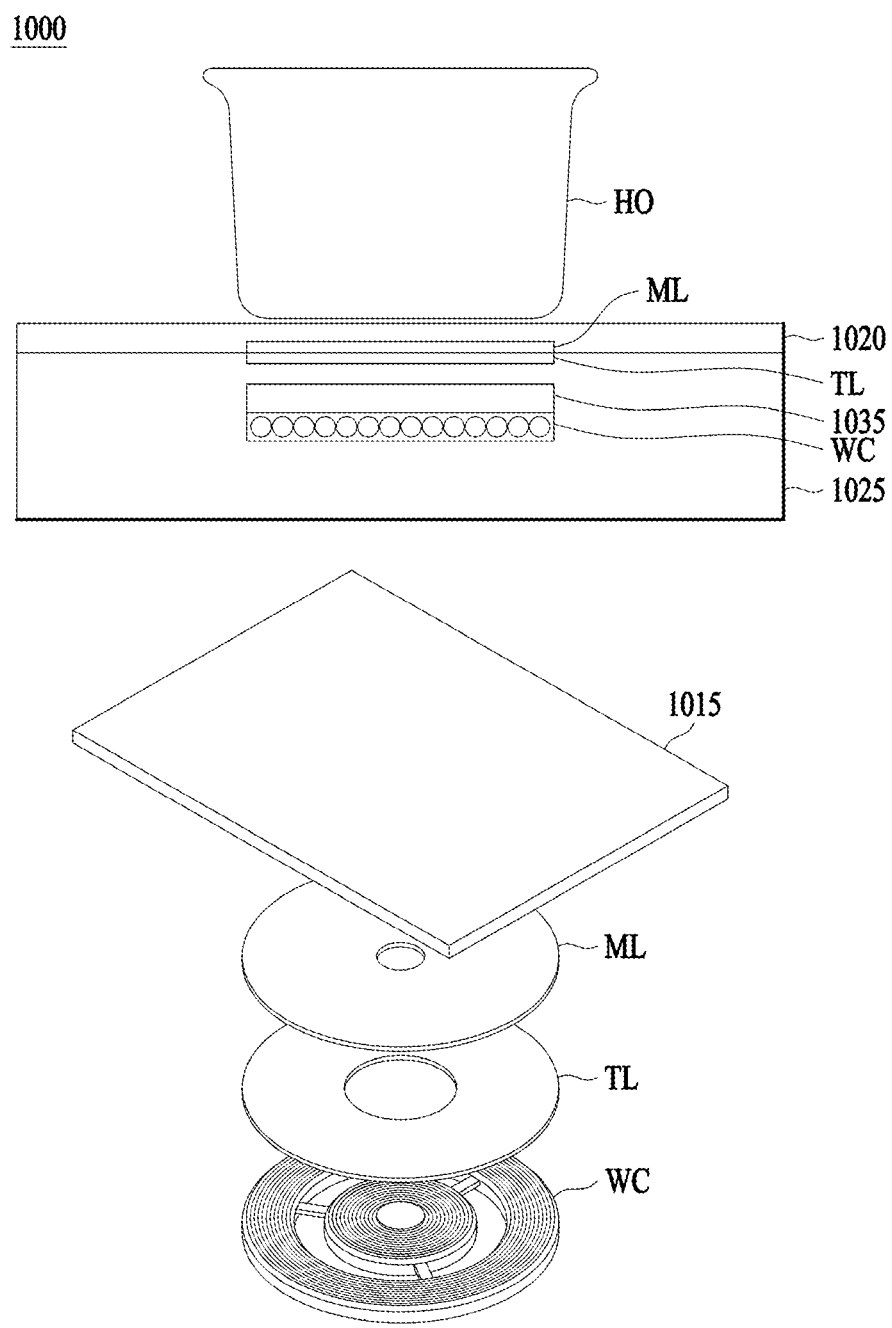

Referring to FIG. 10C, the additional metal film ML may be arranged at the bottom of the cover plate 1020. In some implementations, the additional metal film ML may form a part of the bottom surface of the cover plate 1020 to reduce a difference in height from the bottom surface of the cover plate 1020, the difference which is caused by the presence of the additional metal film ML. In some implementations, the additional metal film ML may not be arranged on the top of the upper plate 1015, thereby not exposed to the outside. The additional metal film ML may be arranged at the bottom of the cover plate 1020 in various ways. In some implementations, the additional metal film ML may be arranged at the bottom of the upper plate 1015 and on the top of the insulator 1035 at the same time.

Figure 10D:
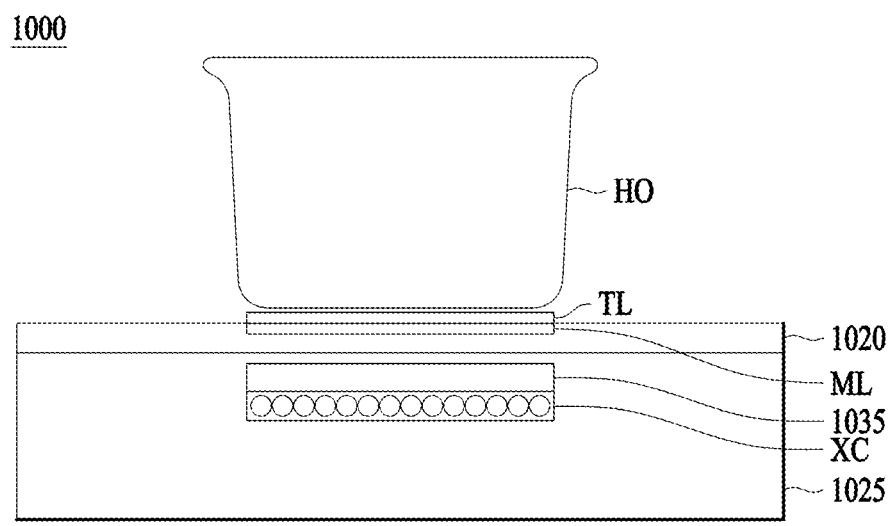
Figure 10D:
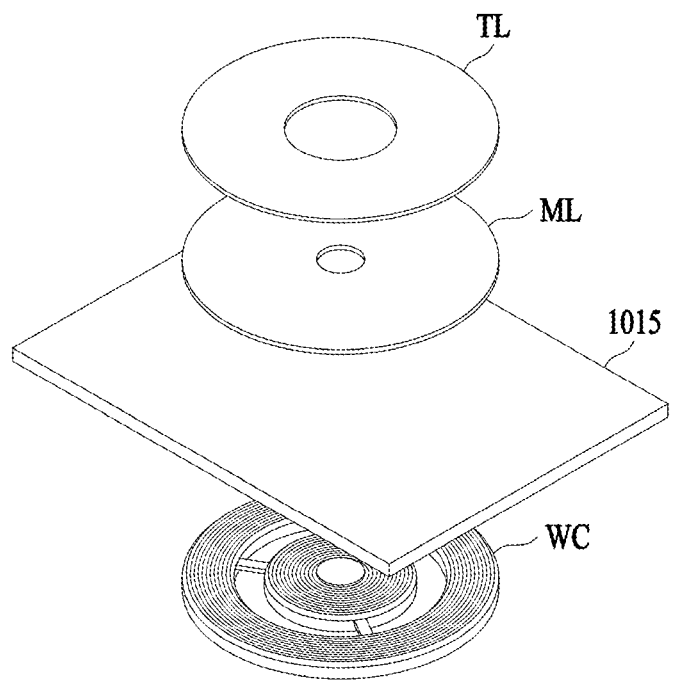

Referring to FIG. 10D, the additional metal film ML and the thin film TL may be arranged on the top of the upper plate 1015. In some implementations, the additional metal film ML may be arranged at the bottom of the thin film TL. For example, the additional metal film ML may be arranged at the upper plate 15 and at the same time arranged between the thin film TL and the upper plate 15. Thus, it may be understood that the additional metal film ML is arranged at the bottom of the thin film TL and on the top of the insulator 1035. In some implementations, the additional metal film ML may form a part of the top surface of the cover plate 1020 to reduce a difference in height from the top surface of the cover plate 1020, the difference which is caused by the presence of the additional metal film ML. In some implementations, the thin film TL may be arranged on the top of the additional metal film ML to reduce a difference in height from the top surface of the cover plate 1020, the difference which is caused by the presence of the additional metal film ML. Therefore, the thin film TL may form a part of the top surface of the cover plate 1020.

FIG. 10A to 10D are merely diagrams for explaining a positional relationship of components of the thin film TL, the additional metal film ML, the working coil WC, and/or other associated parts. The thin film TL, the additional metal film ML, the working coil WC, and other associated parts are not limited to the configurations, shapes and numbers shown in FIGS. 10A to 10D.

Figure 11A:
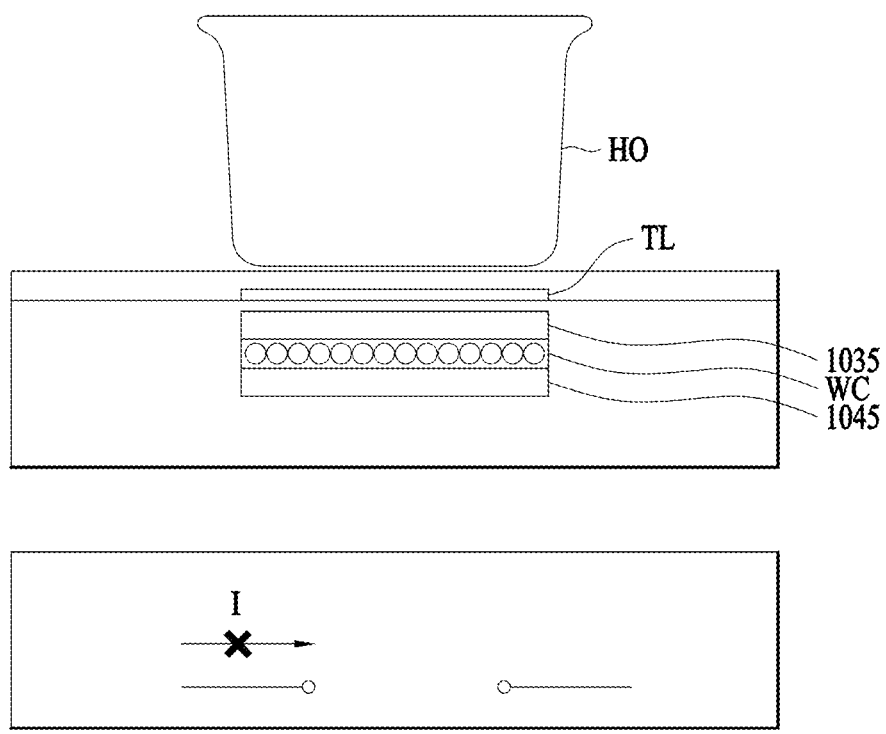
FIGS. 11A and 11B are views for explaining whether an induced current is allowed to flow in an equivalent circuit, which is formed when an object made of aluminum is arranged at an upper plate, depending on whether an additional metal film is used.
Figure 11B:
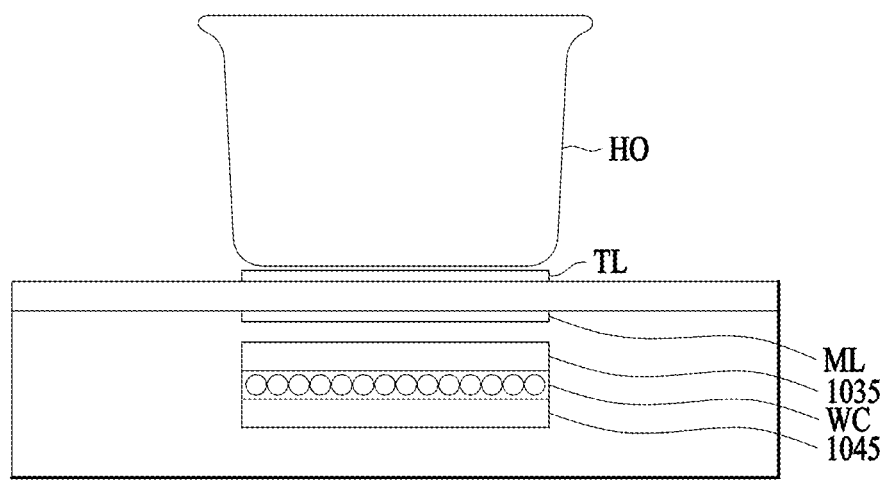
Figure 11B:
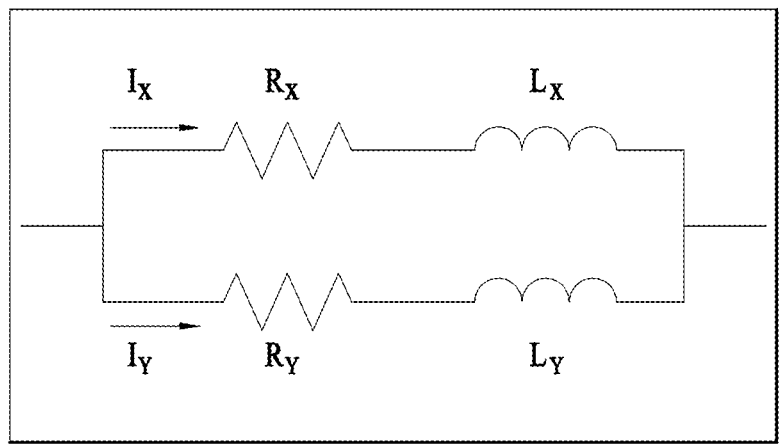
Figure 12:
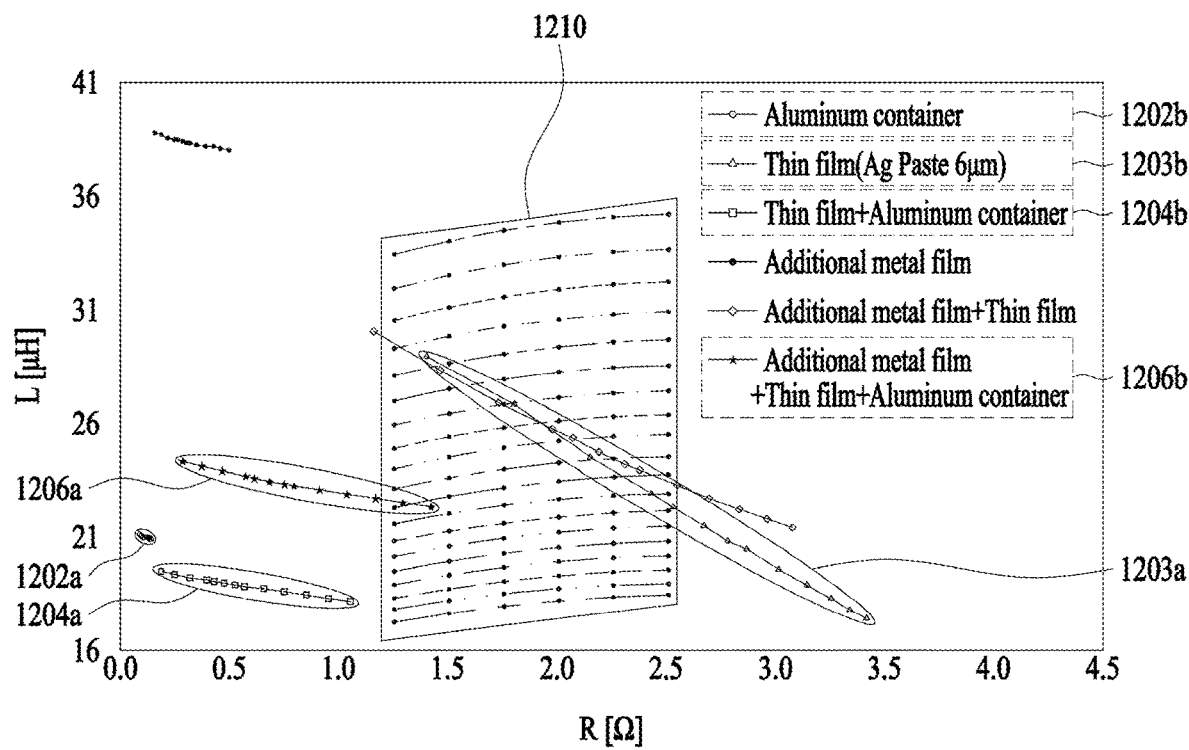
FIG. 12 is a diagram illustrating a distribution of a resistance component and an inductor component of an equivalent circuit capable of induction heating in an induction heating type cooktop.

FIGS. 11A and 11B are diagrams for explaining whether an induced current is allowed to flow in an equivalent circuit, which is formed when a target heating object HO made of aluminum is arranged at an upper plate, depending on whether an additional metal film ML is used. FIG. 12 is a diagram illustrating a distribution of a resistance component and an inductor component of an equivalent circuit capable of induction heating in an induction heating type cooktop.

Referring to FIG. 11A, a cooktop that does not include the additional metal film ML is not capable of inductively heating the target heating object HO made of aluminum. In some implementations, in order to inductively heat the target heating object HO, an equivalent circuit composed of a resistance component and an inductor component should be formed when the working coil WC is operated.

As described above with reference to FIG. 5, when the working coil WC is operated after an object made of a magnetic material is placed, an equivalent circuit composed of a resistance component and an inductor component may be formed by the magnetic material and the thin film TL, as shown in FIG. 5. In this case, heating of the object may be performed in such a way that heat is generated by the thin film TL that is inductively heated at the same time of inductive heating of the magnetic material and the generated heat is transferred to the object. In addition, as described with reference to FIG. 6, when the working coil WC is operated after an object made of a non-magnetic material is placed, an equivalent circuit including a resistance component and an inductor component may be formed by the thin film TL. Then, when the thin film TL is inductively heated, the non-magnetic material may be heated by the heated thin film TL.

However, when the target heating object HO made of aluminum is arranged at the upper plate 1015 as shown in FIG. 11A, an equivalent circuit including a resistance component and an inductor component is not formed by the target heating object HO and the thin film TL, and thus, an induced current does not flow. That is, the microcontroller unit (MCU) of the cooktop that does not include the additional metal film ML cannot recognize that a target heating object (e.g., HO or TL) capable of being inductively heated is arranged at the cooktop, and therefore, it is not possible to perform induction heating of the target heating object (e.g., HO or TL). FIG. 12 shows that the above-described phenomenon occurs because a resistance component and an inductor component, which are formed when an aluminum thin film TL and the target heating object HO are arranged together, are not included in an area in which induction heating is allowable.

Referring to FIG. 12, it is found that induction heating by the working coil WC is possible only when the resistance component and the inductor component are included in an induction heating region 1210. The graph shown in FIG. 12 illustrates a variation of a resistance component and an inductor component of an equivalent circuit of the target heating object HO from a perspective of the working coil WC according to a frequency range applied by the working coil WC.

Referring to FIG. 12, it is found that an equivalent circuit component 1202a formed only by a target heating object made of aluminum (e.g., an aluminum container) 1202b is not included in the induction heating region 1210, and thus induction heating is not possible.

In some implementations, an equivalent circuit component 1203b formed only by a thin films TL is included in the induction heating region 1210, and thus induction heating may be possible. Regarding this, a detailed description has been described above with reference to FIGS. 5 and 6 and thus it is omitted herein.

In some implementations, an equivalent circuit component 1204a formed by the thin film TL and the target heating object HO made of aluminum is not included in the induction heating region 1210, and thus induction heating is not possible. That is, unlike the case where only the thin film TL is arranged, when the thin film TL and the target heating object HO of the aluminum material are arranged together, the equivalent circuit component 1204a may be out of the induction heating region 1210 due to properties of aluminum, and thus induction heating of both the thin film TL and the target heating object HO are not possible.

In some implementations, in the case where the additional metal film ML is further arranged in addition to the thin film TL and the target heating object HO made of aluminum, when the working coil WC is operated, the equivalent circuit component 1206a formed by the additional metal film ML, the thin film TL, and the target heating object HO made of aluminum may be included at least in part in the induction heating region 1210. Accordingly, induction heating of at least one of the target heating object HO and the thin film TL may occur by the working coil WC. Eventually, the target heating object HO may be heated.

In this regard, referring to FIG. 11B, even when the target heating object HO made of aluminum is arranged on the top of the upper plate 1015, the induction heating type cooktop 1000 that includes the additional metal film ML may form an equivalent circuit including a resistance component and an inductor component. Using the equivalent circuit, induction heating may be possible. For example, referring to FIG. 11B, Rx and Lx may indicate a resistance component and an inductor component associated with a target heating object HO made of aluminum, and Ix may indicate an induced current that is induced into the target heating object HO. In addition, Ry and Ly may represent a resistance component and an inductor component associated with the thin film TL and the additional metal film ML, and Ty may represent an induced current that is induced into at least one of the thin film TL and the additional metal film ML. However, since FIG. 11B shows equivalent circuits formed by physical configurations (that is, the target heating object HO, the thin film TL, and the additional metal film ML) when the working coil WC is operated, and thus, Rx, Lx, RY, and Ly in FIG. 11B may be understood as various types of total resistance components, total inductor components, etc. and may be shown in other forms. Therefore, the correspondence between the resistance component, the inductor component, and the physical configuration described in the above-described implementations may be expressed in various forms, which can be understood by a person skilled in the art, in order to indicate the feature that an induced current flows in the target heating object HO.

FIGS. 13A to 13D are diagrams illustrating various cutting types depending on a shape of an additional metal film including at least one sub additional metal film.

In some implementations, the additional metal film ML, which may be additionally arranged at the thin film TL to inductively heat the target heating object HO, may have a shape that is partially cut to prevent an induced current from flowing. When a loop is formed in the additional metal film ML, this may be advantageous for an induced current to flow. Therefore, more heat may be generated, thereby reducing thermal efficiency. Accordingly, in order not to form a loop in the additional metal film ML, the additional metal film ML may be cut at least from the central portion to the outer boundary. In some implementations, the center of the additional metal film ML may be defined as a predetermined point or region including a point where the horizontal length and the vertical length of the additional metal film ML are in half, and the outer boundary may be defined as an outer boundary most distal from the center of the additional metal film ML.

Figure 13A:
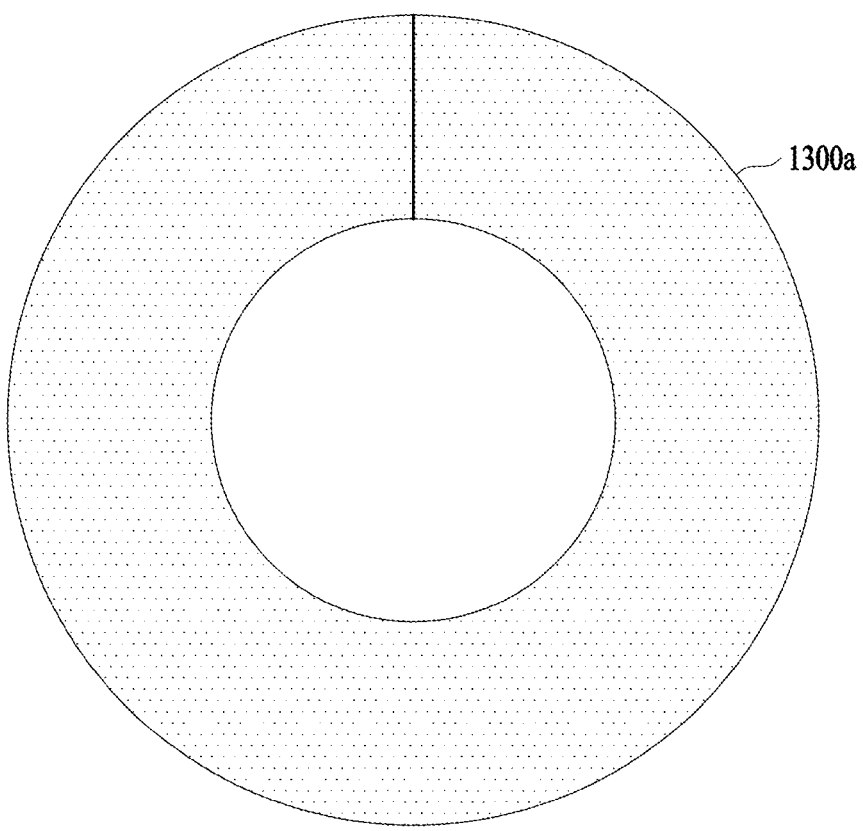
FIGS. 13A to 13D are diagrams illustrating various cutting types depending on a shape of an additional metal film including one or more sub additional metal films.

Referring to FIG. 13A, an additional metal film 1300a may have a ring shape with a hole at the center thereof. In some implementations, the additional metal film 1300a may have a cut ring shape, and thus the additional metal film 1300a does not form a loop. In some implementations, the hole at the center of the additional metal film 1300a may be a hole in any of various shapes including a circular shape.

Figure 13B:
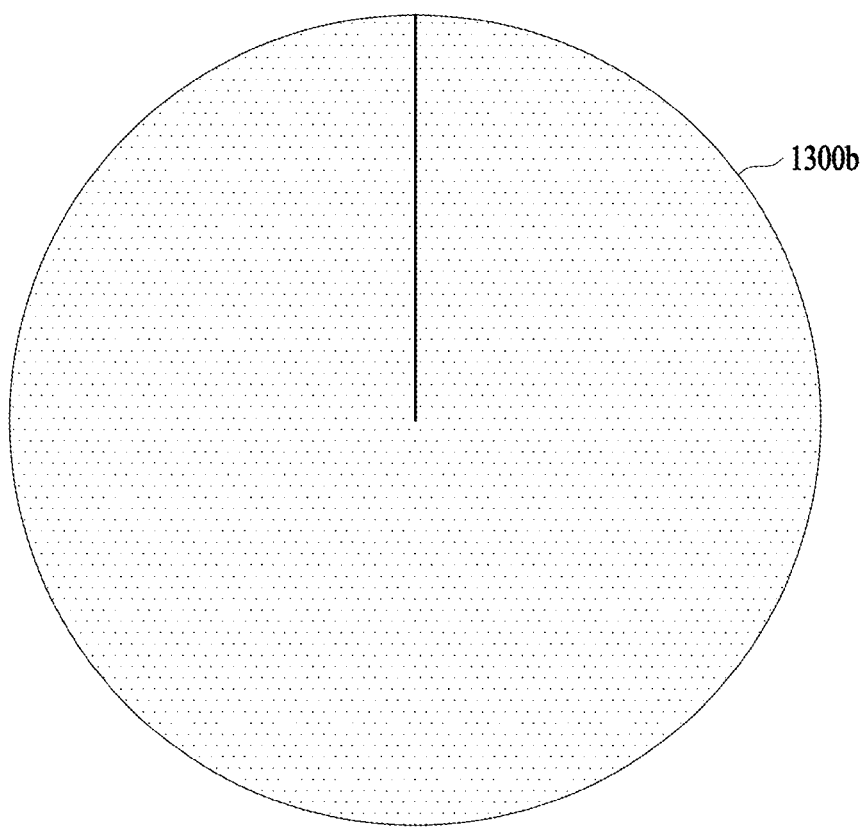

Referring to FIG. 13B, an additional metal film 1300b may be in the shape having no hole at the center thereof. In some implementations, since the additional metal film 1300b does not have a hole at the center thereof, it may be understood that the additional metal film 1300b can be cut to the outer boundary from a point where the horizontal length and the vertical length are in half. In other words, in order not to form a loop, the additional metal film 1300b without a hole at the center thereof may be cut at least from the outer boundary to a point where the horizontal length and the vertical length are in half. Thus, it may be understood that the additional metal film 1300b can be cut to or beyond the point where the horizontal length and the vertical length are in half. In some implementations, the additional metal film 1300b may be in the shape which is fully cut without a hole at the center thereof.

Figure 13C:
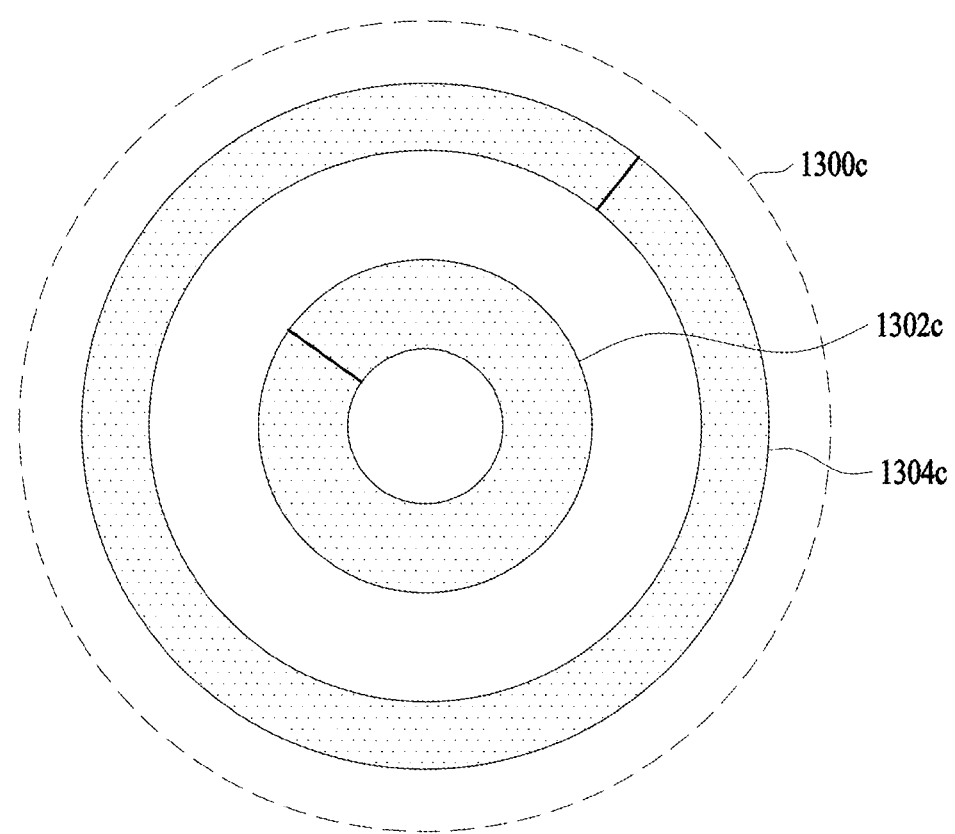

Referring to FIG. 13C, an example additional metal film 1300c can include at least one sub additional metal film (e.g., 1302c and 1304c). In this example, two sub additional metal films 1302c and 1304c are provided. In some implementations, the sub additional metal films 1302c and 1304c may have a ring shape with a hole at the center thereof. In some implementations, at least one of the sub additional metal films 1302c and 1304c, which constitute the additional metal film 1300c, may be partially cut. Accordingly, the sub additional metal films 1302c and 1304c does not form a loop, thereby preventing generation of an induced current. In some implementations, if an equivalent circuit component formed by the thin film TL, the target heating object HO, and the additional metal film 1300c is included in the induction heating region 1210 of FIG. 12, at least one of the sub additional metal films 1302c and 1304c, which constitutes the additional metal film 1300c, may not be partially cut.

Figure 13D:
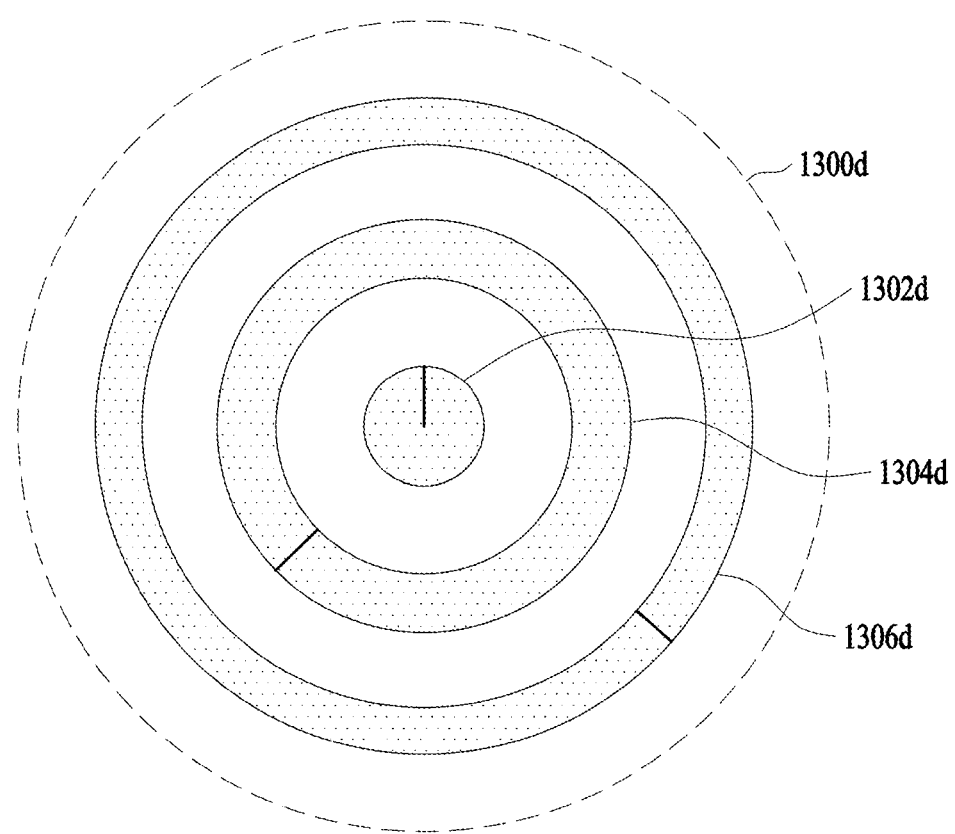

Referring to FIG. 13D, another example additional metal film 1300d includes at least one sub additional metal film (e.g., 1302d, 1304d, and 1306d). In this example, three sub additional metal films 1302d, 1304d, and 1306d are provided. The sub additional metal films 1302d, 1304d, and 1306d may have a ring shape with a hole at the center or may have a ring shape without a hole at the center. In some implementations, the ring-shaped sub additional metal films (e.g., 1304d and 1306d) may have a cut ring shape and thus do not form a loop. In some implementations, the sub additional metal film (e.g., 1302d) without a hole at the center may be cut at least from the outer boundary to a point where the horizontal length and the vertical length are in half, and thus the sub additional metal film does not form a loop. In some implementations, if an equivalent circuit component formed by the thin film TL, the target heating object HO, and the additional metal film 1300d is included in the induction heating region 1210 of FIG. 12, at least one of the sub additional metal films 1302d, 1304d, and 1306d, which constitutes the additional metal film 1300d, may not be partially cut.

Figure 14:
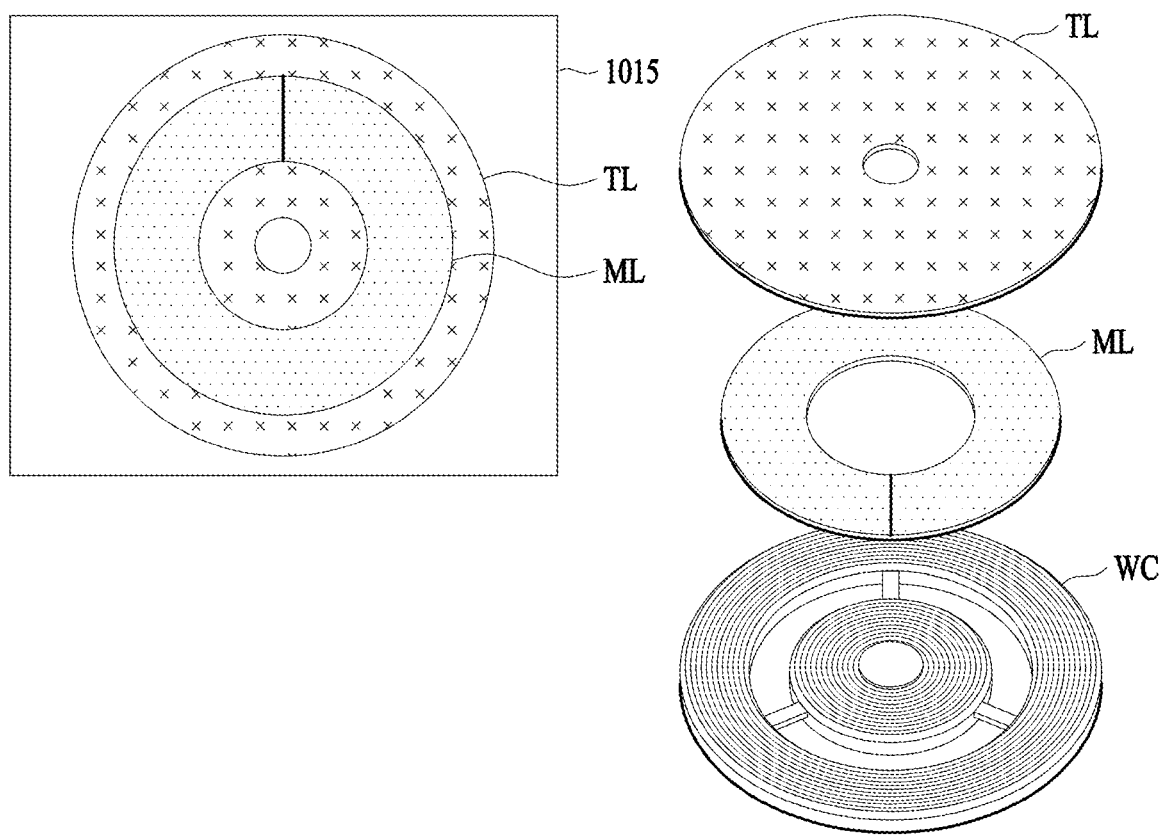
FIG. 14 is a diagram illustrating an example in which an additional metal film has an area equal to or less than a predetermined area.
Figure 15:
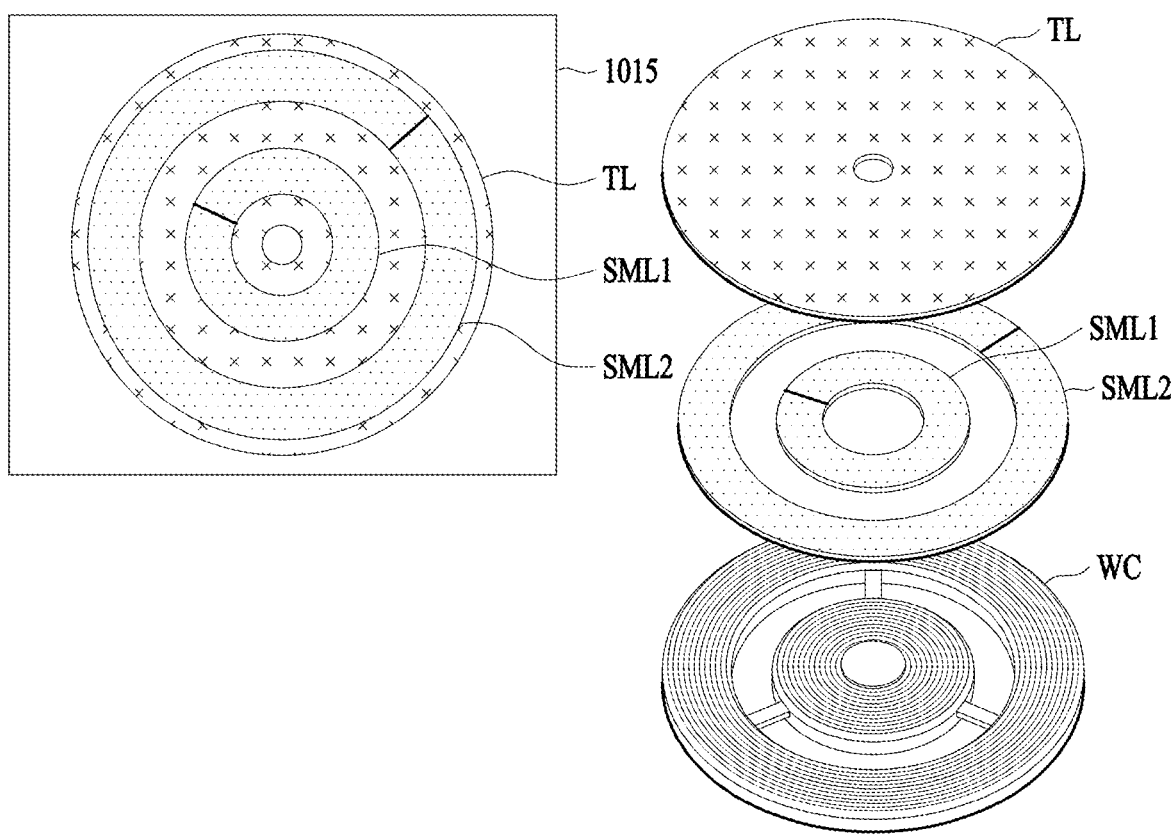
FIG. 15 is a diagram illustrating another example where an additional metal film has an area equal to or less than a predetermined area.

FIG. 14 is a diagram illustrating an example where the additional metal film ML has an area equal to or less than a predetermined area, and FIG. 15 is a diagram illustrating an example where the additional metal film ML has an area equal to or less than a predetermined area according to some implementations.

In some implementations, when the area of the additional metal film ML is larger than a predetermined area, the size of the magnetic field transmitted to the target heating object HO is reduced, thereby reducing heating efficiency. Therefore, the area of the additional metal film ML may be equal to or less than a predetermined area that is determined large enough to an extent where a magnetic field capable of heating the target heating object HO made of aluminum and heating a magnetic material can be transferred to the magnetic material and the thin film TL. In some implementations, the predetermined area of the additional metal film ML may be determined based on an absolute area, a ratio to the area of the thin film TL, a distance to the working coil WC, and other suitable factors.

For example, an available area of the additional metal film ML may be predetermined such that the total area thereof is equal to or less than 100 cm 2 or is ½ or less of the area of the thin film TL. In another example, at the distance to the working coil WC is equal to or greater than 20 cm and less than 30 $cm^2$, an available area of the additional metal film ML may be predetermined such that a total area thereof is equal to or less than 100 cm 2 or is ½ or less of the area of the thin film TL. However, the aforementioned specific values are merely exemplary for explaining that the area of the additional metal film ML should be equal to or less than a predetermined area, and the additional metal film ML should not be construed as limited to the aforementioned values. Therefore, it should be construed that the additional metal film ML is arranged in a variety of dimensions such that a magnetic field capable of heating not just a target heating object HO made of aluminum but also a magnetic object can be transmitted to the magnetic object and a thin film TL.

Referring to FIG. 14, the additional metal film ML may have a cut ring shape with a hole at the center thereof and may be arranged between the working coil WC and the thin film TL. In some implementations, the area of the additional metal film ML may be equal to or less than a predetermined area, and the predetermined area may be a half of the area of the thin film TL. Therefore, the induction heating type cooktop 1000 may include an additional metal film ML having a total area equal to or less than a half of the area of the thin film TL. The additional metal film ML may be provided in the same form, number, and arrangement as described in the aforementioned various implementations.

Referring to FIG. 15, the additional metal film ML may be including a plurality of sub additional metal films (e.g., SML1 and SML2). The plurality of sub additional metal films SML1 and SML2 may be each cut into a ring shape with a hole at the center and may be arranged between the working coil WC and the thin film TL. In some implementations, the total area of the additional metal film ML may correspond to a sum of the areas of the plurality of sub additional metal films SML1 and SML2. The sum of the areas of the plurality of sub additional metal films SML1 and SML2 may be equal to or less than a predetermined area. In some implementations, at least one of the plurality of sub additional metal films SML1 and SML2 may have a shape different from other sub metal films. In some implementations, at least one of the plurality of sub additional metal films SML1 and SML2 may not be cut.

Figure 16A:
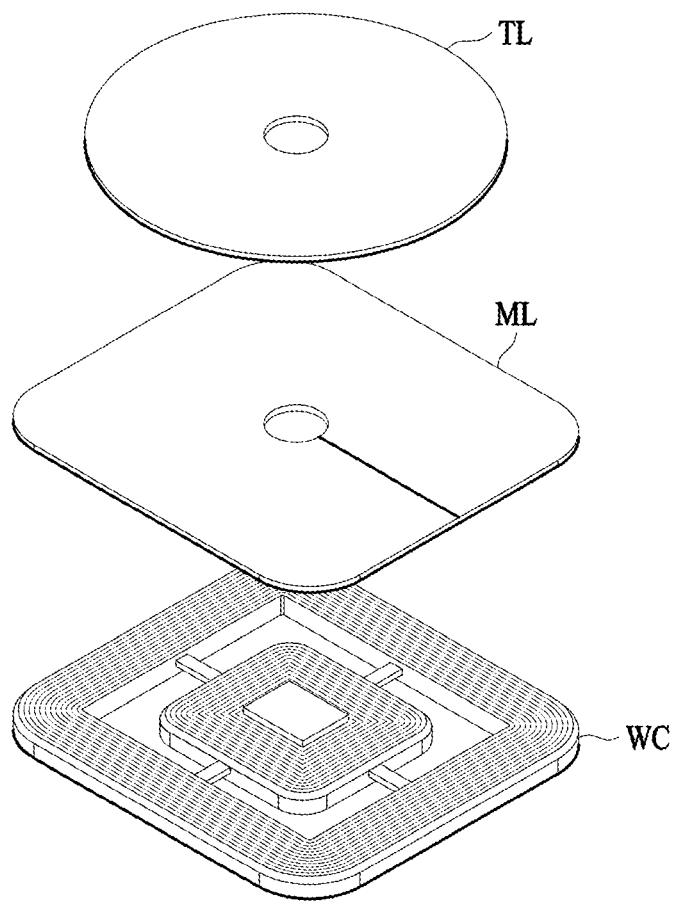
FIGS. 16A to 16C illustrate a shape of an additional metal film having a shape corresponding to at least one of a thin film and a working coil.
Figure 16B:
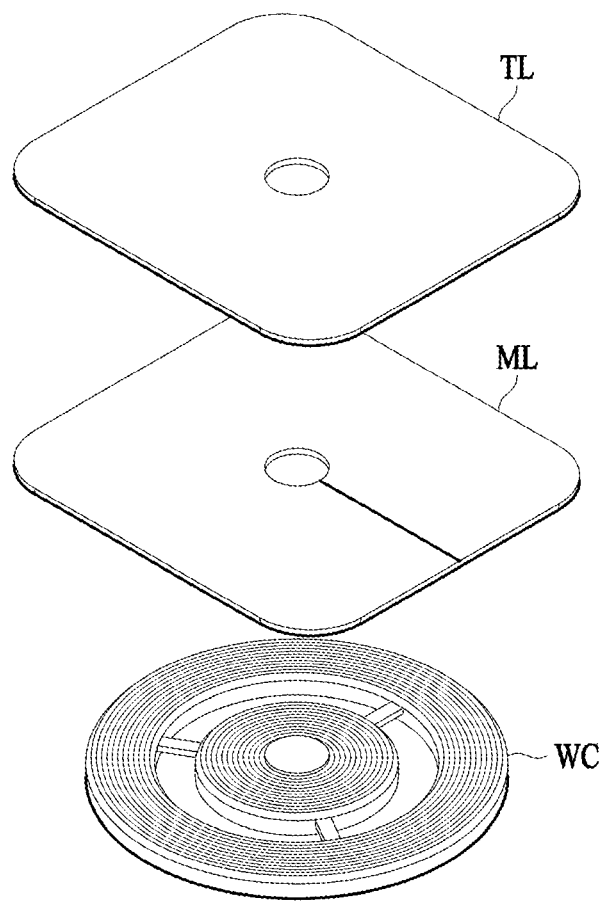
Figure 16C:
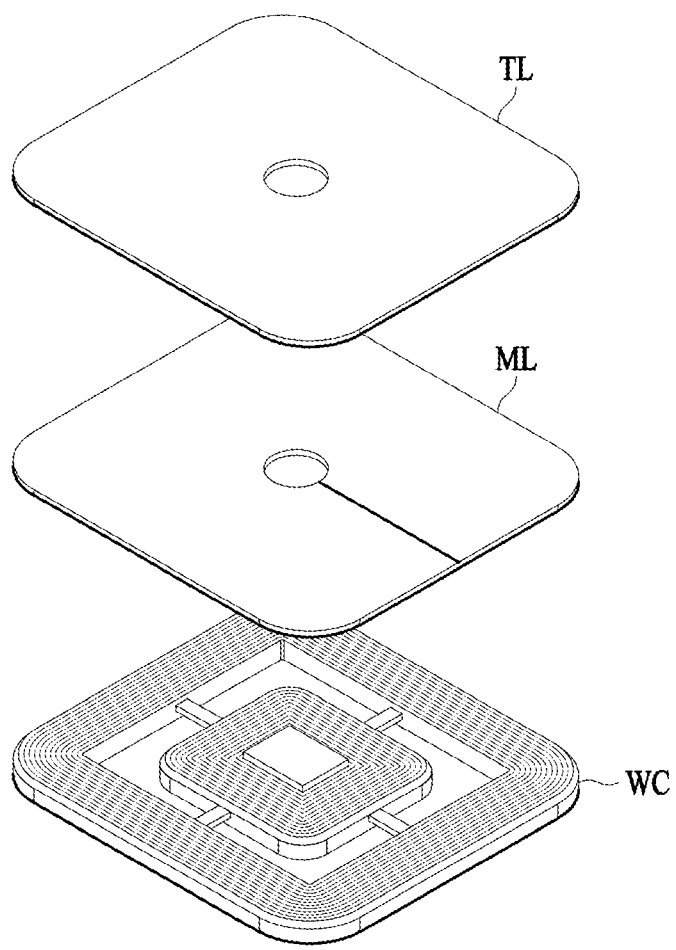

FIGS. 16A through 16C illustrate example shapes of an additional metal film that correspond to a shape of at least one of a thin film and a working coil.

In some implementations, the additional metal film ML may have a shape corresponding to at least one of the thin film TL and the working coil WC. Therefore, the shape of the additional metal film ML may correspond to the shape of the thin film TL, may correspond the shape of the working coil WC, or may correspond to both the shape of the thin film TL and the shape of the working coil WC.

Referring to FIG. 16A, the thin film TL may have a circular ring shape, and the working coil WC may have a rectangular ring shape. In some implementations, the additional metal film ML may have a shape corresponding to the working coil WC, and thus the additional metal film ML may have a rectangular ring shape. In other implementations, the additional metal film ML may have a shape corresponding to the thin film TL. In this case, the additional metal film ML may have a circular ring shape instead of a rectangular ring shape.

Referring to FIG. 16B, the thin film TL may have a rectangular ring shape, and the working coil WC may have a circular ring shape. In some implementations, the additional metal film ML may have a shape corresponding to the thin film TL, and thus the additional metal film ML may have a rectangular ring shape. In other implementations, the additional metal film ML may have a shape corresponding to the shape of the working coil WC. In this case, the additional metal film ML may have a circular ring shape instead of a rectangular ring shape.

Referring to FIG. 16C, the thin film TL and the working coil WC may have a rectangular ring shape, and thus the additional metal film ML may have a rectangular ring shape. In other implementations, the shape of the additional metal film ML may be a shape irrespective of the shape of the thin film TL and the shape of working coil WC. In this case, the additional metal film ML may have a circular ring shape, instead of a rectangular ring shape.

Figure 17:
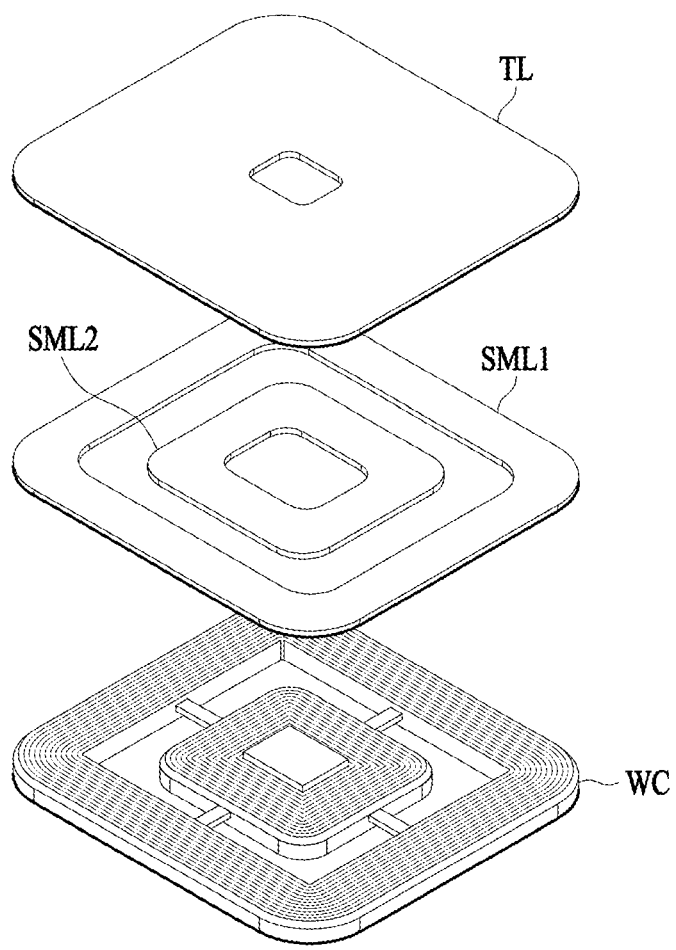
FIG. 17 illustrates an additional metal film including at least one sub additional metal film having a shape corresponding to at least one of a thin film and a working coil.

FIG. 17 illustrates an example additional metal film ML that includes at least one sub additional metal film SML1 and SML2 having a shape corresponding to at least one of the thin film TL and the working coil WC.

In some implementations, the at least one sub additional metal film SML1 and SML2 may have a shape corresponding to at least one of the thin film TL and the working coil WC. Referring to FIG. 17, the thin film TL and the working coil WC may have a rectangular ring shape. In this case, the at least one sub additional metal film SML1 and SML2 may also have a rectangular ring shape. In some implementations, when the shapes of the thin film TL and the working coil WC are different from each other, the shape of the at least one sub additional metal film SML1 and SML2 may correspond to one of the shapes of the thin film TL and the working coil WC.

In some implementations, one or more sub additional metal films SML1 and SML2 may have a shape that corresponds to at least one of the thin film TL and the working coil WC, but may have different shapes from the other sub additional metal film(s) when the thin film TL and the working coil WC have different shapes. For example, when the thin film TL and the working coil WC have different shapes, at least one of the one or more sub additional metal films (e.g., the sub additional metal film SML1) may have a shape corresponding to the shape of the thin film TL, and the rest of the one or more sub additional metal films (e.g., the sub additional metal film SML2) may have a shape corresponding to the shape of the working coil WC. Accordingly, the additional metal film ML may include sub additional metal films SML1 and SML2, shapes of which are different from each other but correspond to a shape of at least one of the thin film TL and the working coil WC.

By using an induction heating type cooktop according to some implementations of the present disclosure, which includes a thin film capable of being directly inductively heated, it is possible to heat both a magnetic object and a non-magnetic object at a single induction burner.

The induction heating type cooktop according to some implementations of the present disclosure is capable of heating a variety of magnetic and non-magnetic objects, including an object made of a metallic material which has been conventionally incapable of being inductively heated (e.g., aluminum), and therefore, it is possible to heat the object regardless of a position and a type of the object. Accordingly, the user does not need to identify the material of the object to heat the object, and therefore, it is possible to improve convenience in use for the user.

In addition, the induction heating type cooktop according to some implementations of the present disclosure is capable of directly or indirectly heating the object using the same heat source, a separate heating plate or a radiant heater is not necessary. Accordingly, it is possible not only to improve heating efficiency but also to cut down material costs.

The foregoing description of the present disclosure is not limited to the aforementioned implementations and the accompanying drawings, and it will be obvious to those skilled in the technical field to which the present disclosure pertains that various substitutions, modifications, and changes may be made within the scope without departing from the technical spirit of the present disclosure.

What is claimed is:

1. An induction cooktop comprising:
    an upper plate configured to support an object to be heated;
    a working coil configured to heat the object;
    a thin film disposed on the upper plate;
    a metal film that forms an equivalent circuit with the thin film and the object and is configured to allow a first current to be induced into the object supported on the upper plate, the first current being induced by the working coil; and
    a thermal insulator disposed between the upper plate and the working coil,
    wherein the working coil is configured to inductively heat at least one of the object or the thin film based on the first current flowing through at least one of the object or the thin film in the equivalent circuit, and
    wherein the thermal insulator is configured to block heat generated by at least one of the object or the thin film that is inductively heated.

2. The induction cooktop of claim 1, wherein the equivalent circuit has a resistance component and an inductor component which represent the metal film, the thin film, and the object.

3. The induction cooktop of claim 1, wherein the equivalent circuit has a resistance component and an inductor component which represent the metal film, the thin film, and the object, wherein the object is made of aluminum.

4. The induction cooktop of claim 1, wherein the thin film is disposed on a first surface or a second surface of the upper plate, the second surface opposite to the first surface.

5. The induction cooktop of claim 1, wherein the first current is applied to the thin film and the object to thereby heat the object, wherein the object is a magnetic object that is not made of aluminum.

6. The induction cooktop of claim 5, wherein a first magnitude of the first current being applied to the magnetic object is greater than a second magnitude of the first current being applied to the thin film.

7. The induction cooktop of claim 1, wherein the metal film is made of a material capable of being heated based on the first current.

8. The induction cooktop of claim 1, wherein the metal film includes a cutout portion that prevents the first current from flowing.

9. The induction cooktop of claim 8, wherein the cutout portion of the metal film extends at least from a center of the metal film towards an outer boundary of the metal film.

10. The induction cooktop of claim 1, wherein the metal film has a shape of at least one of the thin film and the working coil.

11. The induction cooktop of claim 10, wherein the metal film comprises a plurality of metal film parts, at least one of the plurality of metal film parts having a shape of the at least one of the thin film and the working coil.

12. The induction cooktop of claim 1, wherein the metal film is positioned between the working coil and the upper plate so that the object placed on the upper plate is heated based on at least one of the first current or a transferred heat from the thin film heated by the working coil.

13. The induction cooktop of claim 12, wherein the metal film is arranged between the upper plate and the thermal insulator or between the thin film and the thermal insulator.

14. The induction cooktop of claim 12, wherein the metal film has an area equal to or smaller than a predetermined area.

15. The induction cooktop of claim 1, wherein a thickness of the thin film is smaller than a skin depth of the thin film.

16. The induction cooktop of claim 1, wherein a sum of a thickness of the thin film and a thickness of the metal film is less than a sum of a skin depth of the thin film and a skin depth of the metal film.

17. The induction cooktop of claim 1, further comprising:
    a case configured to house the working coil, the upper plate being coupled to the case.

18. The induction cooktop of claim 17, further comprising:
    a cover plate that includes the upper plate and is coupled to the case.

19. The induction cooktop of claim 11, wherein at least two of the plurality of metal film parts are separated from each other.

20. The induction cooktop of claim 19, wherein the at least two of the plurality of metal film parts are disposed coaxially with respect to each other.

* * * * *